US012669438B2

(12) United States Patent
Hoffman et al.

(10) Patent No.: US 12,669,438 B2
(45) Date of Patent: Jun. 30, 2026

(54) SYSTEMS AND METHODS FOR IMAGING SAMPLES

(71) Applicant: 10x Genomics, Inc., Pleasanton, CA (US)

(72) Inventors: David Hoffman, Pleasanton, CA (US); Denis Pristinski, Dublin, CA (US); Evan DeJarnette, San Francisco, CA (US); David Morgan, Castro Valley, CA (US)

(73) Assignee: 10x Genomics, Inc., Pleasanton, CA (US)

( * ) Notice: Subject to any disclaimer, the term of this patent is extended or adjusted under 35 U.S.C. 154(b) by 119 days.

(21) Appl. No.: 18/509,584

(22) Filed: Nov. 15, 2023

(65) Prior Publication Data

US 2024/0171833 A1 May 23, 2024

Related U.S. Application Data

(60) Provisional application No. 63/427,282, filed on Nov. 22, 2022, provisional application No. 63/427,360, filed on Nov. 22, 2022.

(51) Int. Cl.
*G01N 21/64* (2006.01)
*H04N 23/11* (2023.01)
(Continued)

(52) U.S. Cl.
CPC ..... *G01N 21/6456* (2013.01); *G01N 21/6428* (2013.01); *H04N 23/11* (2023.01);
(Continued)

(58) Field of Classification Search
CPC ........... G01N 21/6456; G01N 21/6428; G01N 2021/6439; G01N 2201/062;
(Continued)

(56) References Cited

U.S. PATENT DOCUMENTS 5,599,675 A 2/1997 Brenner
5,750,341 A 5/1998 Macevicz
(Continued)

FOREIGN PATENT DOCUMENTS

WO 1999/060380 A1 11/1999
WO 2001/025779 A2 4/2001
(Continued)

OTHER PUBLICATIONS

International Search Report and Written Opinion, PCT/US23/79739, mailed May 13, 2024, 21 pages.
(Continued)

*Primary Examiner* — Joel W Fosselman
(74) *Attorney, Agent, or Firm* — Patterson + Sheridan, LLP

(57) ABSTRACT

An imaging system includes an optical mounting plate having an aperture disposed between a first portion and a second portion, an imaging sensor disposed on the first portion, an objective lens disposed on the second portion, and an illumination assembly arranged within the aperture and disposed between the imaging sensor and the objective lens. The imaging system includes a heat sink coupled to the illumination assembly and configured to transfer heat away from light sources of the illumination assembly via a working fluid that flows through the heat sink.

20 Claims, 20 Drawing Sheets

(51) Int. Cl.

| | |
|---|---|
| *H04N 23/51* | (2023.01) |
| *H04N 23/52* | (2023.01) |
| *H04N 23/55* | (2023.01) |
| *H04N 23/56* | (2023.01) |

(52) U.S. Cl.
CPC ............. *H04N 23/51* (2023.01); *H04N 23/52* (2023.01); *H04N 23/55* (2023.01); *H04N 23/56* (2023.01); *G01N 2021/6439* (2013.01); *G01N 2201/062* (2013.01); *G01N 2201/0636* (2013.01)

(58) Field of Classification Search
CPC ........... G01N 2201/0636; H04N 23/51; H04N 23/56; H04N 23/52; H04N 23/11; H04N 23/55
USPC ...................................................... 348/207.99
See application file for complete search history.

(56) References Cited

U.S. PATENT DOCUMENTS

| | | | |
|---|---|---|---|
| 6,172,218 | B1 | 1/2001 | Brënner |
| 6,306,597 | B1 | 10/2001 | Macevicz |
| 6,969,488 | B2 | 11/2005 | Bridgham et al. |
| 7,057,026 | B2 | 6/2006 | Barnes et al. |
| 7,632,641 | B2 | 12/2009 | Dirks et al. |
| 7,709,198 | B2 | 5/2010 | Luo et al. |
| 8,551,104 | B2 | 10/2013 | Weckwerth et al. |
| 8,551,710 | B2 | 10/2013 | Bernitz et al. |
| 8,604,182 | B2 | 12/2013 | Luo et al. |
| 8,658,361 | B2 | 2/2014 | Wu et al. |
| 8,951,726 | B2 | 2/2015 | Luo et al. |
| 9,217,178 | B2 | 12/2015 | Fedurco et al. |
| 10,138,509 | B2 | 11/2018 | Church et al. |
| 10,179,932 | B2 | 1/2019 | Church et al. |
| 10,450,599 | B2 | 10/2019 | Pierce et al. |
| 10,457,980 | B2 | 10/2019 | Cai et al. |
| 10,494,662 | B2 | 12/2019 | Church et al. |
| 10,550,429 | B2 | 2/2020 | Harada et al. |
| 2005/0100900 | A1 | 5/2005 | Kawashima et al. |
| 2006/0188901 | A1 | 8/2006 | Barnes et al. |
| 2006/0240439 | A1 | 10/2006 | Smith et al. |
| 2006/0281109 | A1 | 12/2006 | Ost et al. |
| 2007/0166705 | A1 | 7/2007 | Milton et al. |
| 2007/0253042 | A1 | 11/2007 | Szarvas et al. |
| 2009/0118128 | A1 | 5/2009 | Liu et al. |
| 2011/0005986 | A1 | 1/2011 | Kelly et al. |
| 2012/0206050 | A1 | 8/2012 | Spero |
| 2012/0270305 | A1 | 10/2012 | Reed et al. |
| 2013/0079232 | A1 | 3/2013 | Kain et al. |
| 2013/0260372 | A1 | 10/2013 | Buermann et al. |
| 2015/0037876 | A1* | 2/2015 | Kim ................... G01N 21/6486 435/287.2 |
| 2016/0024555 | A1 | 1/2016 | Church et al. |
| 2016/0108458 | A1 | 4/2016 | Frei et al. |
| 2016/0216712 | A1 | 7/2016 | Baumgartner et al. |
| 2016/0369329 | A1 | 12/2016 | Cai et al. |
| 2017/0009278 | A1 | 1/2017 | Söderberg et al. |
| 2017/0220733 | A1 | 8/2017 | Zhuang et al. |
| 2018/0191967 | A1 | 7/2018 | Kester |
| 2019/0055594 | A1 | 2/2019 | Samusik et al. |
| 2019/0106733 | A1 | 4/2019 | Kishi et al. |
| 2019/0161796 | A1 | 5/2019 | Hauling et al. |
| 2019/0177800 | A1 | 6/2019 | Boutet et al. |
| 2019/0194709 | A1 | 6/2019 | Church et al. |
| 2019/0367969 | A1 | 12/2019 | Belhocine et al. |
| 2020/0035893 | A1 | 1/2020 | Jacobs et al. |
| 2020/0224243 | A1 | 7/2020 | Desai et al. |
| 2020/0224244 | A1 | 7/2020 | Nilsson et al. |
| 2021/0164039 | A1 | 6/2021 | Wang et al. |
| 2021/0340618 | A1 | 11/2021 | Kühnemund et al. |
| 2022/0010358 | A1 | 1/2022 | Kühnemund et al. |
| 2022/0064697 | A1 | 3/2022 | Zhuang et al. |
| 2022/0241780 | A1 | 8/2022 | Tentori et al. |

FOREIGN PATENT DOCUMENTS

| | | |
|---|---|---|
| WO | WO 2018/026873 | 2/2018 |
| WO | WO 2021/138676 | 7/2021 |
| WO | WO 2021/167526 | 8/2021 |

OTHER PUBLICATIONS

Chen et al., "Spatially Resolved, Highly Multiplexed RNA Profiling In Single Cells", Science, 348(6233): aaa6090, 2015.
Choi et al., "Third-Generation In Situ Hybridization Chain Reaction: Multiplexed, Quantitative, Sensitive, Versatile, Robust", *Development*, 145(12): dev165753, 2018.
Eng et al., "Transcriptome-Scale Super-Resolved Imaging in Tissues By RNA SeqFISH+", *Nature*, 568(7751): 235-239, 2019.
Frei et al., "Highly Multiplexed Simultaneous Detection of RNAs and Proteins in Single Cells", *Nat Methods*, 13(3): 269-275, 2016.
Goh et al., "Highly Specific Multiplexed RNA Imaging In Tissues With Split-FISH", *Nat Methods*, 17(7): 689-693, 2020.
Gyllborg et al., "Hybridization-Based In Situ Sequencing (HybISS) For Spatially Resolved Transcriptomics In Human And Mouse Brain Tissue", *Nucleic Acid Res*, 48(19): e112, 2020.
Lee et al., "Highly Multiplexed Subcellular RNA Sequencing In Situ", *Science*, 342(6177): 1360-1363, 2014.
Mitra et al., "Fluorescent In Situ Sequencing On Polymerase Colonies", *Anal. Biochem*, 320: 55-65, 2003.
Moffitt et al., "RNA Imaging With Multiplexed Error-Robust Fluorescence In Situ Hybridization (MERFISH)", *Methods of Enzymology*, 572: 1-49, 2016.
Nagendran et al., "Automated Cell-Type Classification In Intact Tissues By Single- Cell Molecular Profiling", *eLife*, 7: e30510, 2018.
Shendure et al., "Accurate Multiplex Polony Sequencing of an Evolved Bacterial Genome", *Science*, 309: 1728-1732, 2005.
Tripathi et al., "Z Probe, An Efficient Tool For Characterizing Long Non-Coding RNA in FFPE Tissues", *Noncoding RNA*, 4(3): 20, 2018.
Wang et al., "Three-Dimensional Intact-Tissue Sequencing Of Single-Cell Transcriptional States", *Science*, 361(6499): 5691, 2018.
Wu et al., "RollFISH Achieves Robust Quantification of Single-Molecule RNA Biomarkers In Paraffin-Embedded Tumor Tissue Samples", *Commun Biol*, 1, 209, 2018.
Yang et al., "Single-Cell Phenotyping Within Transparent Intact Tissue Through Whole-Body Clearing", *Cell*, 158(4): 945-958, 2014.

* cited by examiner

Full Multiband Configuration
(Multiband exciter, multiband emitter, and multiband dichroic)

Pinkel Configuration
(Multiband emitter, multiband dichroic, and single-band exciters)

Sedat Configuration
(Multiband dichroic, single-band exciters, and single-band emitters)

SYSTEMS AND METHODS FOR IMAGING SAMPLES

CROSS REFERENCE TO RELATED APPLICATION

This application claims priority to and the benefit of U.S. provisional patent application Ser. Nos. 63/427,360, filed on Nov. 22, 2022, and 63/427,282, filed on Nov. 22, 2022, the entire contents of which are incorporated herein by reference and relied upon.

FIELDS OF THE DISCLOSURE

The present disclosure generally relates to systems and methods for illuminating and imaging samples in an opto-fluidic instrument. More particularly, the present disclosure relates to optics module configurations and an illumination assembly within the optics module in an opto-fluidic instrument for imaging of biological specimens and methods of producing the optics module.

BACKGROUND

Analytical systems/tools used for imaging biological specimens require the components of the analytical systems/tools to be suitable for performing the imaging at an optimal condition. As off-the-shelf components and currently existing solutions may not be adequate for use in state-of-the-art or next-generation imaging systems/tools, there is a need for a specifically designed and purposefully configured imaging systems and components that can be used in imaging of biological specimens.

SUMMARY

In various embodiments, an imaging system includes an optical mounting plate having a first portion, a second portion, and an aperture disposed between the first portion and the second portion. The imaging system includes an imaging sensor disposed on the first portion. The imaging system includes an objective lens disposed on the second portion. The imaging system includes an illumination assembly arranged within the aperture and disposed between the imaging sensor and the objective lens.

In various embodiments, a system includes a sensor array configured for imaging a sample. The system includes an objective lens assembly optically coupled to the sensory array. The system includes an illumination assembly disposed between the sensor array and the objective lens assembly. The illumination assembly includes a plurality of light units with each light unit comprising a light source and a set of optical components. The system includes a cooling module coupled to the illumination assembly. The cooling module includes a heat sink thermally coupled to light sources of the plurality of light units.

In various embodiments, an imaging system includes an optics plate having a first side, a second side, and a thickness therebetween. The optics plate includes a first mounting surface extending from the first side and a second mounting surface extending from the first side. The first mounting surface and the second mounting surface are substantially planar. The optics plate includes an aperture between the first mounting portion and the second mounting portion. The imaging system includes an objective lens assembly coupled to the second mounting surface. The imaging system includes an illumination assembly disposed within the aperture. The imaging system includes an imaging sensor mounted on the first mounting surface. The imaging sensor is configured for capturing the reflected light redirected by the kinematic fold mirror.

In various embodiments, an optical alignment plate includes a base having a first side, a second side, and a thickness therebetween. The first side defines a first plane, and a first mounting surface extends from the first side. The optical alignment plate includes a second mounting surface extending from the first side. The first mounting surface and the second mounting surface are substantially planar and define a second plane that is parallel to the first plane. The optical alignment plate comprises an aperture between the first mounting portion and the second mounting portion.

In various embodiments, a method of producing an optical alignment plate includes providing a base plate having a first side, a second side, and a thickness therebetween. The method includes forming a first mounting surface and a second mounting surface by removing material on the first side. The method includes forming an aperture in the base plate. The method includes anodizing the base plate. The method includes forming a second plane on the first mounting surface and the second mounting surface after anodization.

In various embodiments, an apparatus including a first light unit having a first set of optical components comprising a first excitation filter, a first dichroic mirror, and a first emission filter altogether configured for light emission at a first band of wavelengths. The apparatus includes a second light unit having a second set of optical components comprising a second excitation filter, a second dichroic mirror, and a second emission filter altogether configured for light emission at a second band of wavelengths, wherein the first and second sets of optical components are selected such that the first band of wavelengths and the second band of wavelengths have less than 5% of crosstalk.

In various embodiments, an apparatus includes a first light unit and a second light unit. The first light unit includes a first light source and the second light unit includes a second light source. The apparatus includes a cooling module. The cooling module includes a heat sink coupled the first light source and the second light source. The first light source and the second light source are each capable of operating at a supplied electrical current between 15 amperes and 30 amperes and are electrically isolated from one another.

BRIEF DESCRIPTION OF THE DRAWINGS

For a more complete understanding of the principles disclosed herein, and the advantages thereof, reference is now made to the following descriptions taken in conjunction with the accompanying drawings, in which.

Figure 1:
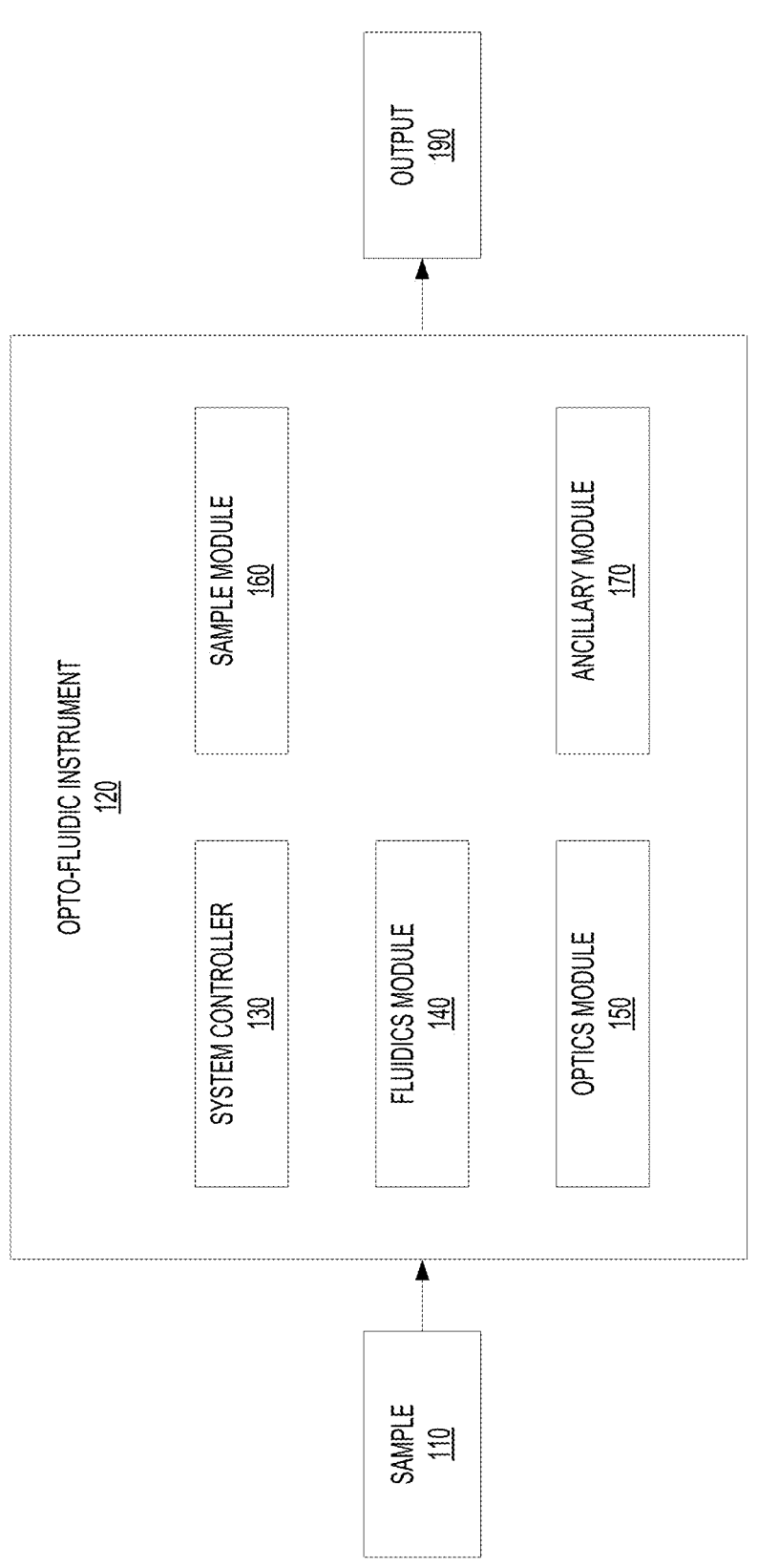
FIG. 1 is an example workflow of analysis of a biological sample (e.g., various cell, tissue, fluid, etc. sample and/or swab) using an opto-fluidic instrument, according to various embodiments.

It is to be understood that the figures are not necessarily drawn to scale, nor are the objects in the figures necessarily drawn to scale in relationship to one another. The figures are depictions that are intended to bring clarity and understanding to various embodiments of apparatuses, systems, and methods disclosed herein. Wherever possible, the same reference numbers will be used throughout the drawings to refer to the same or like parts. Moreover, it should be appreciated that the drawings are not intended to limit the scope of the present teachings in any way.

DETAILED DESCRIPTION

I. Overview

Target molecules (e.g., nucleic acids, proteins, antibodies, etc.) can be detected in biological samples (e.g., one or more cells or a tissue sample) using an instrument having integrated optics and fluidics modules (an "opto-fluidic instrument"). In an opto-fluidic instrument, the fluidics module is configured to deliver one or more reagents (e.g., fluorescent probes) to the biological sample and/or remove spent reagents therefrom. Additionally, the optics module is configured to illuminate the biological sample with light having one or more spectral emission curves (over a range of wavelengths) and subsequently capture one or more images of emitted light signals from the biological sample during one or more probing cycles. In various embodiments, the captured images may be processed in real time and/or at a later time to determine the presence of the one or more target molecules in the biological sample, as well as three-dimensional position information associated with each detected target molecule. Additionally, the opto-fluidics instrument includes a sample module configured to receive (and, optionally, secure) one or more biological samples. In some instances, the sample module includes an X-Y stage configured to move the biological sample along an X-Y plane (e.g., perpendicular to an objective lens of the optics module).

In various embodiments, the opto-fluidic instrument is configured to analyze one or more target molecules in their naturally occurring place (i.e., in situ) within the biological sample. For example, an opto-fluidic instrument may be an in-situ analysis system used to analyze a biological sample and detect target molecules including but not limited to DNA, RNA, proteins, antibodies, and/or the like.

A sample disclosed herein can be or be derived from any biological sample. Biological samples may be obtained from any suitable source using any of a variety of techniques including, but not limited to, biopsy, surgery, and laser capture microscopy (LCM), and generally includes cells, tissues, and/or other biological material from the subject. A biological sample can be obtained from a prokaryote such as a bacterium, an archaea, a virus, or a viroid. A biological sample can also be obtained from eukaryotic mammalian and eukaryotic non-mammalian organisms (e.g., a plant, a fungus, an insect, an arachnid, a nematoda, a reptile, or an amphibian). A biological sample can also be obtained from a eukaryote, such as a tissue sample from a mammal. A biological sample from an organism may comprise one or more other organisms or components therefrom. For example, a mammalian tissue section may comprise a prion, a viroid, a virus, a bacterium, a fungus, or components from other organisms, in addition to mammalian cells and non-cellular tissue components. Subjects from which biological samples can be obtained can be healthy or asymptomatic subjects, subjects that have or are suspected of having a disease (e.g., an individual with a disease such as cancer) or a pre-disposition to a disease, and/or subjects in need of therapy or suspected of needing therapy.

The biological sample can include any number of macromolecules, for example, cellular macromolecules and organelles (e.g., mitochondria and nuclei). The biological sample can be obtained as a tissue sample, such as a tissue section, biopsy, a core biopsy, needle aspirate, or fine needle aspirate. The sample can be a fluid sample, such as a blood sample, urine sample, or saliva sample. The sample can be a skin sample, a colon sample, a cheek swab, a histology sample, a histopathology sample, a plasma or serum sample, a tumor sample, living cells, cultured cells, a clinical sample such as, for example, whole blood or blood-derived products, blood cells, or cultured tissues or cells, including cell suspensions.

In some embodiments, the biological sample may comprise cells or a tissue sample which are deposited on a substrate. As described herein, a substrate can be any support that is insoluble in aqueous liquid and allows for positioning of biological samples, analytes, features, and/or reagents on the support. In some embodiments, a biological sample is attached to a substrate. In some embodiments, the substrate is optically transparent to facilitate analysis on the opto-fluidic instruments disclosed herein. For example, in some instances, the substrate is a glass substrate (e.g., a microscopy slide, cover slip, or other glass substrate). Attachment of the biological sample can be irreversible or reversible, depending upon the nature of the sample and subsequent steps in the analytical method. In certain embodiments, the sample can be attached to the substrate reversibly by applying a suitable polymer coating to the substrate and contacting the sample to the polymer coating. The sample can then be detached from the substrate, e.g., using an organic solvent that at least partially dissolves the polymer coating. Hydrogels are examples of polymers that are suitable for this purpose. In some embodiments, the substrate can be coated or functionalized with one or more substances to facilitate attachment of the sample to the substrate. Suitable substances that can be used to coat or functionalize the substrate include, but are not limited to, lectins, poly-lysine, antibodies, and polysaccharides.

A variety of steps can be performed to prepare or process a biological sample for and/or during an assay using the opto-fluidic instruments disclosed herein. Except where indicated otherwise, the preparative or processing steps described below can generally be combined in any manner and in any order to appropriately prepare or process a particular sample for and/or analysis.

For example, a biological sample can be harvested from a subject (e.g., via surgical biopsy, whole subject sectioning) or grown in vitro on a growth substrate or culture dish as a population of cells and prepared for analysis as a tissue slice or tissue section (e.g., a fresh frozen, fixed frozen, or formalin fixed paraffin embedded (FFPE) tissue section). The thickness of a tissue section typically depends on the method used to prepare the section and the physical characteristics of the tissue, and therefore sections having a wide variety of different thicknesses can be prepared and used.

In some instances, the biological sample is fixed in any of a variety of suitable fixatives to preserve the biological structure of the sample prior to analysis. Exemplary fixatives include formalin, formaldehyde, ethanol, methanol, acetone, paraformaldehyde (PFA)-Triton, and combinations thereof.

In some embodiments, the biological sample can be permeabilized to facilitate transfer of analytes out of the sample, and/or to facilitate transfer of species (such as probes or probes sets) into the sample. In general, the biological sample can be permeabilized by exposing the sample to one or more permeabilizing agents. Suitable agents for this purpose include, but are not limited to, organic solvents (e.g., acetone, ethanol, and methanol), cross-linking agents (e.g., paraformaldehyde), detergents (e.g., saponin, Triton X-100™ or Tween-20™), and enzymes (e.g., trypsin, proteases).

In some embodiments, the biological sample is embedded in a polymer and/or crosslinked matrix (e.g., a hydrogel matrix). Embedding the sample in this manner typically involves contacting the biological sample with a hydrogel such that the biological sample becomes surrounded by the hydrogel. For example, the sample (e.g., a tissue section on a substrate, such as a glass substrate) can be embedded by contacting the sample with a suitable polymer material and activating the polymer material to form a hydrogel. In some embodiments, the hydrogel is formed such that the hydrogel is internalized within the biological sample. In some embodiments, the biological sample (including biological analytes) is immobilized in the hydrogel via cross-linking of the polymer material that forms the hydrogel. Cross-linking can be performed chemically and/or photochemically, or alternatively by any other suitable hydrogel-formation method. In some instances, biological molecules (or derivatives thereof) are cross-linked or otherwise covalently attached to the hydrogel. For example, in some embodiments, nucleic acid molecules (or derivatives thereof, such as an amplification product or probe(s) bound to cellular nucleic acid molecule) in a tissue sample are cross-linked or otherwise covalently attached to the hydrogel.

Hydrogels embedded within biological samples can be cleared using any suitable method. For example, electrophoretic tissue clearing methods or surfactant-based (e.g., sodium dodecyl sulfate (SDS)) clearing methods can be used to remove biological macromolecules from the hydrogel-embedded sample.

Tissue clearing is a process of optically resolving a sample or complex biological material, such as whole organs, large tissue, and cellular models, with minimal changes to morphology and without compromising the ability for immunolabeling or fluorescence imaging detection. In various embodiments, refractive index matching is used for obtaining fluorescence images. Mismatching among mediums can cause loss of imaging resolution, as light may also travel through the sample itself, a mounting media, glass coverslip, oil, and/or a microscope objective. In various embodiments, the amount of variable scattering of light from cellular membranes, lipids, and/or molecules of the specimen is reduced (e.g., minimized) using the various methods described herein. Heterogeneity of scattering among the cellular components may lead to an increase in opaqueness of an image. In various embodiments, a denser makeup of lipids, trafficking organelles, and other subcellular molecules may increase lateral, or non-forward, light scattered. In various embodiments, non-forward light scattering in situ may not pass through the specimen, as it is exacerbated by the continuous, pinball like, interactions of scattered light with neighboring molecules. In various embodiments, through the multiplicity of scattering, refraction, and absorbance the energy of light may be reduced or ultimately lost, leading to a distorted and white, non-translucent image. In various embodiments, a clearing reagent and mountant optically clears the sample by matching the refractive index to minimizing the light scattering through the specimen and to the microscope objective.

In various embodiments, optical clearing may be performed via various different approaches, primarily being divided into chemical and matrix-based approaches. In various embodiments, chemical approaches include aqueous-based or solvent-based approaches to achieve a highly resolved 3D image for immunolabeling, immuno-cytochemistry, immuno-histochemistry, and/or immunofluorescence. In various embodiments, aqueous-based clearing approaches are generally used to avoid dehydration and toxicity, which can destroy the integrity of a sample.

In various embodiments, passive clarity technique (PACT) is a passive tissue clearing and immunolabeling protocol. In various embodiments PACT is used for intact thick organs. In various embodiments, RIMS includes a protocol for passive tissue clearing and immunostaining of intact organs that is compatible for long-term storage and has imaging media that preserves fluorescent markers over months.

In various embodiments, refractive index matching solutions (RIMS) may be produced with sugar or glycerol for simple, passive immersion. This may be used with thinner or smaller samples, as they are easier to clear and can maintain fluorescent protein emission. In various embodiments, such immersion techniques may achieve less than 1.5 refractive index and can take days to achieve clearing, resulting in reduced image quality when compared to solvent approaches, due to refractive index mismatching between the cleared sample, the glass coverslip, and immersion oil (glass and oil have an RI of 1.51). As sugar or glycerol solutions may take extended periods for clearing, a sample can experience considerable shrinkage while losing lipid content. In various embodiments, commercially available solutions control morphological alterations and loss of lipid content while achieving a higher refractive index of 1.52. In various embodiments, considerations for clearing include sample type and thickness so that there is minimal shrinkage of the sample and preservation of lipid content and fluorescence.

In various embodiments, perfusion-assisted agent release in situ (PARS) includes a method for whole-body clearing and phenotyping compatible with endogenous fluorescence. In various embodiments, all steps for PARS, including preservation, clearing, and labeling, are performed in situ prior to tissue extraction. In various embodiments, PARS, together with RIMS, transform opaque, intact, whole-organisms into optically transparent, fluorescently labeled samples for visualization with conventional confocal microscopy and phenotypic analysis at the cellular, subcellular, and/or single-molecule transcripts level as described in "Single-Cell Phenotyping within Transparent Intact Tissue through Whole-Body Clearing" by Yang et al. Cell. Vol 158, Issue 4, P945-958, (Aug. 14, 2014) (accessible online at https://doi.org/10.1016/j.cell.2014.07.017).

A biological sample may comprise one or a plurality of analytes of interest. The opto-fluidic instruments disclosed herein can be used to detect and analyze a wide variety of different analytes. In some aspects, an analyte can include any biological substance, structure, moiety, or component to be analyzed. For example, the analyte may include any biomolecule or chemical compound, including a macromolecule such as a protein or peptide, a lipid or a nucleic acid molecule, or a small molecule, including organic or inorganic molecules. The analyte may be a cell or a microorganism, including a virus, or a fragment or product thereof. An analyte can be any substance or entity for which a specific binding partner (e.g., an affinity binding partner) can be developed and detected (e.g., using the opto-fluidic instruments disclosed herein).

Analytes of particular interest may include nucleic acid molecules, such as DNA (e.g. genomic DNA, mitochondrial DNA, plastid DNA, viral DNA, etc.) and RNA (e.g. mRNA, microRNA, IRNA, snRNA, viral RNA, etc.), and synthetic and/or modified nucleic acid molecules, (e.g. including nucleic acid domains comprising or consisting of synthetic or modified nucleotides such as LNA, PNA, morpholino, etc.), proteinaceous molecules such as peptides, polypeptides, proteins or prions or any molecule which includes a protein or polypeptide component, etc., or fragments thereof. The analyte may be a single molecule or a complex that contains two or more molecular subunits, e.g., including but not limited to complexes between proteins or peptides and nucleic acid molecules such as DNA or RNA, e.g., interactions between proteins and nucleic acids, e.g., regulatory factors, such as transcription factors, and DNA or RNA.

In some embodiments, the opto-fluidic instruments described herein can be utilized for the in situ detection and analysis of cellular analytes, (such as nucleic acid sequences), such as fluorescent in situ hybridization (FISH)-based methods, in situ transcriptomic analysis, or in situ sequencing, for example from intact tissues or samples in which the spatial information has been preserved. In some aspects, the embodiments can be applied in an imaging or detection method for multiplexed nucleic acid analysis. In some aspects, the provided opto-fluidic instruments can be used to detect a signal associated with a detectable label of a nucleic acid probe that is hybridized to a target sequence of a target nucleic acid in a biological sample.

Disclosed herein, in some aspects, are labelling agents (e.g., nucleic acid probes and/or probe sets) that are introduced into a cell or used to otherwise detect an analyte in a biological sample such as a tissue sample. The labelling agents include nucleic acid-based probes (e.g., the primary probes disclosed herein and/or any detectable probe disclosed herein) and may comprise any of a variety of entities that can hybridize to a nucleic acid, typically by Watson-Crick base pairing, such as DNA, RNA, LNA, PNA, etc. The nucleic acid probes may comprise a hybridization region that is able to directly or indirectly bind to at least a portion of a target sequence in a target nucleic acid. The nucleic acid probe may be able to bind to a specific target nucleic acid (e.g., an mRNA, or other nucleic acids disclosed herein).

Specific probe designs can vary depending on the application and any suitable probe or probe set may be utilized and detected using the opto-fluidic instruments described herein. In some aspects, the probes or probe sets described herein, or intermediate probes (e.g., a secondary probe, and/or a higher order probe) can be selected from the group consisting of a circular probe, a circularizable probe, and a linear probe. In some embodiments, a circular probe is pre-circularized prior to hybridization to a target nucleic acid and/or one or more other probes. In some embodiments, a circularizable probe is circularized (e.g., by ligation) upon hybridization to a target nucleic acid and/or one or more other probes such as a splint. In some embodiments, a linear probe can be one that comprises a target recognition sequence and a sequence that does not hybridize to a target nucleic acid, such as a 5' overhang, a 3' overhang, and/or a linker or spacer (which may comprise a nucleic acid sequence, such a one or more barcode sequence, or a non-nucleic acid moiety). In some embodiments, the sequence (e.g., the 5' overhang, 3' overhang, and/or linker or spacer) is non-hybridizing to the target nucleic acid but may hybridize to one another and/or one or more other probes, such as detectably labeled probes.

In some embodiments, a primary probe, a secondary probe, and/or a higher order probe disclosed herein can comprise a padlock-like probe or probe set, such as one described in U.S. Pat. No. 8,551,710, US 2020/0224244, US 2019/0055594, US 2021/0164039, US 2016/0108458, or US 2020/0224243, each of which is incorporated herein by reference in its entirety. Any suitable combination of the probe designs described herein can be used.

In some embodiments, the probes or probe sets described herein (e.g., a primary probe, or a secondary probe, and/or a higher order probe disclosed herein) can comprise two or more parts. In some cases, a probe can comprise one or more features of and/or be modified based on: a split FISH probe or probe set described in WO 2021/167526A1 or Goh et al., "Highly specific multiplexed RNA imaging in tissues with split-FISH," *Nat Methods* 17(7):689-693 (2020), which are incorporated herein by reference in their entireties; a Z-probe or probe set, such as one described in U.S. Pat. No. 7,709,198 B2, U.S. Pat. No. 8,604,182 B2, U.S. Pat. No. 8,951,726 B2, U.S. Pat. No. 8,658,361 B2, or Tripathi et al., "Z Probe, An Efficient Tool for Characterizing Long Non-Coding RNA in FFPE Tissues," *Noncoding RNA* 4(3):20 (2018), which are incorporated herein by reference in their entireties; an HCR initiator or amplifier, such as one described in U.S. Pat. No. 7,632,641 B2, US 2017/0009278 A1, U.S. Pat. No. 10,450,599 B2, or Choi et al., "Third-generation in situ hybridization chain reaction: multiplexed, quantitative, sensitive, versatile, robust," *Development* 145 (12): dev165753 (2018), which are incorporated herein by reference in their entireties; a PLAYR probe or probe set, such as one described in US 2016/0108458 A1 or Frei et al., "Highly multiplexed simultaneous detection of RNAs and proteins in single cells," *Nat Methods* 13(3):269-75 (2016), which are incorporated herein by reference in their entireties; a PLISH probe or probe set, such as one described in US 2020/0224243 A1 or Nagendran et al., "Automated cell-type classification in intact tissues by single-cell molecular profiling," *eLife* 7:e30510 (2018), which are incorporated herein by reference in their entireties; a Roll-FISH probe or probe set such as one described in Wu et al., "RollFISH achieves robust quantification of single-molecule RNA biomarkers in paraffin-embedded tumor tissue samples," *Commun Biol* 1, 209 (2018), which is hereby incorporated by reference in its entirety; a MERFISH probe or probe set, such as one described in US 2022/0064697 A1 or Chen et al., "Spatially resolved, highly multiplexed RNA profiling in single cells," *Science* 348(6233): aaa6090 (2015), which are incorporated herein by reference in their entireties; a primer exchange reaction (PER) probe or probe set, such as one described in US 2019/0106733 A1, which is hereby incorporated by reference in its entirety.

In some instances, probes and/or probe sets are directly labeled with one or more detectable labels (e.g., an optically detectable label, such as a florescent moiety) that are detected on the opto-fluidic instruments disclosed herein. In other instances, probes and/or probe sets comprise a target binding region and one or more nucleic acid barcode sequences that identify the analyte. In these embodiments, the barcode sequence(s) may be detected on the opto-fluidic instruments disclosed herein to identify the analyte in the sample. In some instances, a probe or probe set disclosed herein is a circularizable probe or probe set (e.g., a padlock probe or padlock-like probe) comprising a barcode region comprising one or more barcode sequences.

The probes and/or probe sets describe herein may comprise any suitable number of barcode sequences. In some embodiments, the probes or probe sets may comprise 1, 2, 3, 4, 5, 6, 7, 8, 9, 10, 11, 12, 13, 14, 15 or more, 20 or more, 30 or more, 40 or more, or 50 or more barcode sequences. As an illustrative example, a first probe may contain a first target-binding sequence, a first barcode sequence, and a second barcode sequence, while a second, different probe may contain a second target-binding sequence (that is different from the first target-binding sequence in the first probe), the same first barcode sequence as in the first probe, but a third barcode sequence instead of the second barcode sequence. Such probes may thereby be distinguished by determining the various barcode sequence combinations present or associated with a given probe at a given location in a sample.

In some embodiments, a labelling agent may include analyte binding moiety that interacts with an analyte (e.g., a protein) in the sample (e.g., a cell or tissue sample) and a reporter oligonucleotide comprising one or more barcode sequences associated with the analyte and/or analyte binding moiety. For example, a labelling agent that is specific to one type of cell feature (e.g., a first protein) may have coupled thereto a first reporter oligonucleotide, while a labelling agent that is specific to a different cell feature (e.g., a second protein) may have a different reporter oligonucleotide coupled thereto. In some embodiments, an analyte binding moiety includes, but is not limited to, a protein, a peptide, an antibody (or an epitope binding fragment thereof), a lipophilic moiety (such as cholesterol), a cell surface receptor binding molecule, a receptor ligand, a small molecule, a bi-specific antibody, a bi-specific T-cell engager, a T-cell receptor engager, a B-cell receptor engager, a pro-body, an aptamer, a monobody, an affimer, a darpin, and a protein scaffold, or any combination thereof. For a description of exemplary labelling agents, reporter oligonucleotides, and methods of use, see, e.g., U.S. Pat. No. 10,550,429; U.S. Pat. Pub. 20190177800; and U.S. Pat. Pub. 20190367969, which are each incorporated by reference herein in their entirety.

In some embodiments, the nucleic acid probes, probe sets, reporter oligonucleotides, barcode sequences, etc. may be detected directly on the opto-fluidic instruments disclosed herein (e.g., primary probes comprise a detectable label, such as a florescent moiety), and/or by using secondary (or higher order) nucleic acid probes able to bind to the primary probes. In some embodiments, the nucleic acid probes (e.g., primary probes and/or secondary probes) are compatible with one or more biological and/or chemical reactions. For instance, a nucleic acid probe disclosed herein can serve as a template or primer for a polymerase (e.g., a circularized probe in a rolling circle amplification (RCA) reaction), a template or substrate for a ligase, a substrate for a click chemistry reaction, and/or a substrate for a nuclease (e.g., endonuclease or exonuclease for cleavage or digestion). In some instances, labelling agents (such as a primary probe set) are added to a biological sample (e.g., a cell or tissue sample) using the opto-fluidic instrument and subsequently detected using opto-fluidic instrument (e.g., using detectably labeled primary probes, sequential hybridization of detectable labelled oligonucleotides to primary probes, in situ sequencing (e.g., SBS, SBL, SBH), and the like). In some instances, labelling agents (such as a primary probe set) are added to a biological sample (e.g., a cell or tissue sample) outside the optofluidic instrument and the sample is loaded onto the opto-fluidic instruments disclosed herein for detection (e.g., using sequential hybridization of detectable labelled oligonucleotides, in situ sequencing (e.g., SBS, SBL, SBH), and the like).

In some embodiments, detection of the analytes, probes, probe sets, barcodes, etc. described herein can be performed in situ on the opto-fluidic instruments disclosed herein. In situ sequencing typically involves incorporation of a labeled nucleotide (e.g., fluorescently labeled mononucleotides or dinucleotides) in a sequential, template-dependent manner or hybridization of a labeled primer (e.g., a labeled random hexamer) to a nucleic acid template such that the identities (e.g., nucleotide sequence) of the incorporated nucleotides or labeled primer extension products can be determined, and consequently, the nucleotide sequence of the corresponding template nucleic acid. Aspects of in situ sequencing approaches are described, for example, in Mitra et al., "Fluorescent in situ sequencing on polymerase colonies" *Anal. Biochem.* 320, 55-65 (2003), and Lee et al., "Highly Multiplexed Subcellular RNA Sequencing in Situ" *Science,* 343(6177), 1360-1363 (2014). In addition, examples of methods and systems for performing in situ sequencing are described in US 2016/0024555, US 2019/0194709, and in U.S. Pat. Nos. 10,138,509, 10,494,662 and 10,179,932.

In some embodiments, sequencing can be performed by sequencing-by-synthesis (SBS). In some embodiments, a sequencing primer is complementary to sequences at or near the target to be detected (e.g., one or more barcode(s)). In such embodiments, sequencing-by-synthesis can comprise reverse transcription and/or amplification in order to generate a template sequence from which a primer sequence can bind. Exemplary SBS methods comprise those described for example, but not limited to, US 2007/0166705, US 2006/0188901, U.S. Pat. No. 7,057,026, US 2006/0240439, US 2006/0281109, US 2011/005986, US 2005/0100900, U.S. Pat. No. 9,217,178, US 2009/0118128, US 2012/0270305, US 2013/0260372, and US 2013/0079232.

In some embodiments, sequence analysis of nucleic acids (e.g., nucleic acids such as RCA products comprising barcode sequences) can be performed by sequential hybridization (e.g., sequencing by hybridization and/or sequential in situ fluorescence hybridization). Sequential fluorescence hybridization can involve sequential hybridization of detection probes comprising an oligonucleotide and a detectable label. In some embodiments, a method disclosed herein comprises sequential hybridization of the detectable probes disclosed herein, including detectably labeled probes (e.g., fluorophore conjugated oligonucleotides) and/or probes that are not detectably labeled per se but are capable of binding (e.g., via nucleic acid hybridization) and being detected by detectably labeled probes. Exemplary methods comprising sequential fluorescence hybridization of detectable probes are described in US 2019/0161796, US 2020/0224244, US 2022/0010358, US 2021/0340618, and WO 2021/138676, MERFISH (described for example in Moffitt et. al., "Chapter One—RNA Imaging with Multiplexed Error-Robust Fluorescence In Situ Hybridization (MERFISH)" *Methods in Enzymology,* 572, 1-49 (2016)), and hybridization-based in situ sequencing (HybISS) (described for example in Gyllborg et al., "Hybridization-based in situ sequencing (HybISS) for spatially resolved transcriptomics in human and mouse brain tissue," *Nucleic Acids Res* 48(19):e112 (2020)) all of which are incorporated herein by reference.

In some embodiments, sequencing can be performed using sequencing by ligation (SBL). Such techniques utilize DNA ligase to incorporate oligonucleotides and identify the incorporation of such oligonucleotides. The oligonucleotides typically have different labels that are correlated with the identity of a particular nucleotide in a sequence to which the oligonucleotides hybridize. Aspects and features involved in sequencing by ligation are described, for example, in Shendure et al. "Accurate Multiplex Polony Sequencing of an Evolved Bacterial Genome," *Science,* 309: 1728-1732, (2005) and in U.S. Pat. Nos. 5,599,675; 5,750, 341; 6,969,488; 6,172,218; and 6,306,597. Exemplary techniques for in situ SBL comprise, but are not limited to, STARmap (described for example in Wang et al., "Three-dimensional intact-tissue sequencing of single-cell transcriptional states," *Science,* 361(6499) 5691 (2018) and US 2021/0164039).

In some embodiments, probe barcodes (e.g., plurality of probes or probe sets comprising one or more barcode sequences) or complements or products thereof are targeted by detectably labeled detection oligonucleotides, such as fluorescently labeled oligonucleotides. In some embodiments, one or more decoding schemes (e.g., sequential rounds of fluorescent probe hybridization) are used on the opto-fluidic instruments disclosed herein to decode the signals, such as fluorescence, for sequence identification. In any of the embodiments herein, barcodes (e.g., primary and/or secondary barcode sequences) can be analyzed (e.g., detected or sequenced using the opto-fluidic instruments disclosed herein) using any suitable methods or techniques, comprising those described herein, such as RNA sequential probing of targets (RNA SPOTs), sequential fluorescent in situ hybridization (seqFISH), single-molecule fluorescent in situ hybridization (smFISH), multiplexed error-robust fluorescence in situ hybridization (MERFISH), hybridization-based in situ sequencing (HybISS), in situ sequencing, targeted in situ sequencing, fluorescent in situ sequencing (FISSEQ), or spatially-resolved transcript amplicon readout mapping (STARmap). In some embodiments, the methods provided herein comprise analyzing the barcodes by sequential hybridization and detection with a plurality of labelled probes (e.g., detection oligonucleotides or detectable probes). Exemplary decoding schemes are described in Eng et al., "Transcriptome-scale Super-Resolved Imaging in Tissues by RNA SeqFISH+," *Nature* 568(7751):235-239 (2019); Chen et al., *Science;* 348(6233):aaa6090 (2015); Gyllborg et al., *Nucleic Acids Res* 48(19):e112 (2020); U.S. Pat. No. 10,457,980 B2; US 2016/0369329 A1; WO 2018/026873 A1; and US 2017/0220733 A1, all of which are incorporated by reference in their entirety. In some embodiments, these assays enable signal amplification, combinatorial decoding, and error correction schemes at the same time.

It is to be noted that, although the above discussion relates to an opto-fluidic instrument that can be used for in situ target molecule detection via probe hybridization, the discussion herein equally applies to any opto-fluidic instrument that employs any imaging or target molecule detection technique. That is, for example, an opto-fluidic instrument may include a fluidics module that includes fluids used for establishing the experimental conditions used for the probing of target molecules in the sample. Further, such an opto-fluidic instrument may also include a sample module configured to receive the sample, and an optics module including an imaging system for illuminating (e.g., exciting one or more fluorescent probes within the sample) and/or imaging light signals received from the probed sample. The in-situ analysis system may also include other ancillary modules configured to facilitate the operation of the opto-fluidic instrument, such as, but not limited to, cooling systems, motion calibration systems, etc.

Accordingly, various embodiments encompassed herein relate to a machine vision system that can be used to calibrate various motion control systems/components that can be used for precise and reliable positioning various instrumental components of the imaging system/tool configured imaging of biological specimens. In accordance with various embodiments, the disclosed machine vision system can be implemented in systems or tools that use calibration or performing precise and reliable positioning functions of various motion control systems/components as described further below.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

Descriptions and examples of various terms, as used herein, are provided in Section II below.

II. Exemplary Descriptions of Terms

As used herein the specification, "a" or "an" may mean one or more. As used herein in the claim(s), when used in conjunction with the word "comprising," the words "a" or "an" may mean one or more than one. Some embodiments of the disclosure may consist of or consist essentially of one or more elements, method steps, and/or methods of the disclosure. It is contemplated that any method or composition described herein can be implemented with respect to any other method or composition described herein and that different embodiments may be combined.

The use of the term "or" in the claims is used to mean "and/or" unless explicitly indicated to refer to alternatives only or the alternatives are mutually exclusive, although the disclosure supports a definition that refers to only alternatives and "and/or." For example, "x, y, and/or z" can refer to "x" alone, "y" alone, "z" alone, "x, y, and z," "(x and y) or z," "x or (y and z)," or "x or y or z." It is specifically contemplated that x, y, or z may be specifically excluded from an embodiment. As used herein "another" may mean at least a second or more.

The term "ones" means more than one.

As used herein, the term "plurality" may be 2, 3, 4, 5, 6, 7, 8, 9, 10, or more.

As used herein, the term "set of" means one or more. For example, a set of items includes one or more items.

As used herein, the phrase "at least one of," when used with a list of items, means different combinations of one or more of the listed items may be used and only one of the items in the list may be needed. The item may be a particular object, thing, step, operation, process, or category. In other words, "at least one of" means any combination of items or number of items may be used from the list, but not all of the items in the list may be required. For example, without limitation, "at least one of item A, item B, or item C" means item A; item A and item B; item B; item A, item B, and item C; item B and item C; or item A and C. In some cases, "at least one of item A, item B, or item C" means, but is not limited to, two of item A, one of item B, and ten of item C; four of item B and seven of item C; or some other suitable combination.

As used herein, "substantially" means sufficient to work for the intended purpose. The term "substantially" thus allows for minor, insignificant variations from an absolute or perfect state, dimension, measurement, result, or the like such as would be expected by a person of ordinary skill in the field but that do not appreciably affect overall performance. When used with respect to numerical values or parameters or characteristics that can be expressed as numerical values, "substantially" means within ten percent.

As used herein, the term "about" refers to include the usual error range for the respective value readily known. Reference to "about" a value or parameter herein includes (and describes) embodiments that are directed to that value or parameter per se. For example, description referring to "about X" includes description of "X". In some embodiments, "about" may refer to ±15%, ±10%, ±5%, or ±1% as understood by a person of skill in the art.

While the present teachings are described in conjunction with various embodiments, it is not intended that the present teachings be limited to such various embodiments. On the contrary, the present teachings encompass various alternatives, modifications, and equivalents, as will be appreciated by those of skill in the art.

In describing the various embodiments, the specification may have presented a method and/or process as a particular sequence of steps. However, to the extent that the method or process does not rely on the particular order of steps set forth herein, the method or process should not be limited to the particular sequence of steps described, and one skilled in the art can readily appreciate that the sequences may be varied and still remain within the spirit and scope of the various embodiments.

Throughout this specification, unless the context requires otherwise, the words "comprise", "comprises" and "comprising" will be understood to imply the inclusion of a stated step or element or group of steps or elements but not the exclusion of any other step or element or group of steps or elements. By "consisting of" is meant including, and limited to, whatever follows the phrase "consisting of." Thus, the phrase "consisting of" indicates that the listed elements are required or mandatory, and that no other elements may be present. By "consisting essentially of" is meant including any elements listed after the phrase, and limited to other elements that do not interfere with or contribute to the activity or action specified in the disclosure for the listed elements. Thus, the phrase "consisting essentially of" indicates that the listed elements are required or mandatory, but that no other elements are optional and may or may not be present depending upon whether or not they affect the activity or action of the listed elements.

Reference throughout this specification to "one embodiment," "an embodiment," "a particular embodiment," "a related embodiment," "a certain embodiment," "an additional embodiment," or "a further embodiment" or combinations thereof means that a particular feature, structure or characteristic described in connection with the embodiment is included in at least one embodiment of the present disclosure. Thus, the appearances of the foregoing phrases in various places throughout this specification are not necessarily all referring to the same embodiment. Furthermore, the particular features, structures, or characteristics may be combined in any suitable manner in various embodiments.

III. Overview of an Opto-Fluidic Instrument

FIG. 1 shows an example workflow of analysis of a biological sample 110 (e.g., cell or tissue sample) using an opto-fluidic instrument 120, according to various embodiments. In various embodiments, the sample 110 can be a biological sample (e.g., a tissue) that includes molecules targeted for analysis (i.e., target molecules), such as DNA, RNA, proteins, antibodies, etc. In various embodiments, the biological sample is a fresh frozen tissue. In various embodiments, the biological sample is a formalin-fixed paraffin-embedded (FFPE) sample. For example, the sample 110 can be a sectioned tissue that is treated to access the RNA thereof for labeling with circularizable DNA probes. In various embodiments, ligation of the probes generates a circular DNA probe which can be enzymatically amplified and bound with fluorescent oligonucleotides, to produce a sufficiently bright signal that facilitates image acquisition and has a high signal-to-noise ratio.

In various embodiments, the sample 110 may be placed in the opto-fluidic instrument 120 for analysis and detection of the target molecules in the sample 110. In various embodiments, the opto-fluidic instrument 120 is configured to facilitate the experimental conditions conducive for the detection of the molecules. For example, the opto-fluidic instrument 120 can include a fluidics module 140, an optics module 150, a sample module 160, and at least one ancillary module 170, and these modules may be operated by a system controller 130 to create the experimental conditions for the probing of the target molecules in the sample 110 by selected probes (e.g., circularizable DNA probes), as well as to facilitate the imaging of the probed sample (e.g., by an imaging system of the optics module 150). In various embodiments, the various modules of the opto-fluidic instrument 120 may be separate components. In various embodiments, the various modules of the opto-fluidic instrument 120 may be in electrical in communication with each other. In various embodiments, at least some of the modules of the opto-fluidic instrument 120 may be integrated together into a single module.

In various embodiments, the sample module 160 may be configured to receive the sample 110 in the opto-fluidic instrument 120. For instance, the sample module 160 may include a sample interface module (SIM) that is configured to receive a sample device (e.g., cassette) in which a substrate (having the sample 110 positioned thereon) can be secured. In various embodiments, the substrate is a glass slide. That is, the sample 110 may be placed in the opto-fluidic instrument 120 by securing the substrate having the sample 110 (e.g., the sectioned tissue) within the sample device that is then inserted into the SIM of the sample module 160. In various embodiments, the SIM includes an alignment mechanism configured to secure the sample device within the SIM and align the sample device in X, Y, and Z axes within the SIM. In some instances, the sample module 160 may also include an X-Y stage onto which the SIM is mounted. The X-Y stage may be configured to move the SIM mounted thereon (e.g., and as such the sample device containing the sample 110 inserted therein) in perpendicular directions along a two-dimensional (2D) plane of the opto-fluidic instrument 120. Additional discussion related to the SIM can be found in Applicant's U.S. application Ser. No. 18/328,200, filed Jun. 2, 2023, titled "Methods, Systems, and Devices for Sample Interface," which is incorporated herein by reference in its entirety.

The experimental conditions that are conducive for the detection of the target molecules in the sample 110 may depend on the target molecule detection technique that is employed by the opto-fluidic instrument 120. For example, in various embodiments, the opto-fluidic instrument 120 can be a system that is configured to detect molecules in the sample 110 via sequencing by hybridization of probes. In such cases, the experimental conditions can include molecule hybridization conditions that result in the intensity of hybridization of the target molecule (e.g., nucleic acid) to a probe (e.g., oligonucleotide) being significantly higher when the probe sequence is complementary to the target molecule than when there is a single-base mismatch. The hybridization conditions include the preparation of the sample 110 using reagents such as washing/stripping reagents, hybridizing reagents, etc., and such reagents may be provided by the fluidics module 140.

In various embodiments, the fluidics module 140 may include one or more components that may be used for storing the afore-mentioned reagents, as well as for transporting said reagents to and from the sample device containing the sample 110. For example, the fluidics module 140 may include one or more reservoirs configured to store the reagents, as well as a waste container configured for collecting the reagents (e.g., and other waste) after use by the opto-fluidic instrument 120 to analyze and detect the molecules of the sample 110. In various embodiments, the one or more reservoirs include one or more high use reagent reservoirs. In various embodiments, the fluidics module 140 may be configured to receive one or more low use reagent plates (e.g., a 96 deep well plate). Further, the fluidics module 140 may also include pumps, tubes, pipettes, etc., that are configured to facilitate the transport of the one or more reagents (e.g. high use reagent and/or low use reagent) to the sample device and thus contact the sample 110 with the reagent (e.g., high use reagent and/or low use reagent). For instance, the fluidics module 140 may include one or more pumps ("reagent pumps") that are configured to pump washing and/or stripping reagents to the sample device for use in washing/stripping the sample 110. In various embodiments, the fluidics module 140 may be configured for other washing functions such as washing an objective lens of the imaging system of the optics module 150).

In various embodiments, the ancillary module 170 includes a cooling system (i.e. a heat transfer system) of the opto-fluidic instrument 120. In various embodiments, the cooling system includes a network of coolant-carrying tubes configured to transport coolants to various modules of the opto-fluidic instrument 120 for regulating the temperatures thereof. In such cases, the ancillary module 170 may include one or more heat transfer components of a heat transfer circuit. In various embodiments, the heat transfer components include one or more coolant reservoirs for storing coolants and pumps (e.g., "coolant pumps") for generating a pressure differential, thereby forcing the coolants to flow from the reservoirs to the various modules of the opto-fluidic instrument 120 via the coolant-carrying tubes. In some instances, the heat transfer components of the ancillary module 170 may include returning coolant reservoirs that may be configured to receive and store returning coolants, i.e., heated coolants flowing back into the returning coolant reservoirs after absorbing heat discharged by the various modules of the opto-fluidic instrument 120. In such cases, the ancillary module 170 may also include one or more cooling fans that are configured to force air (e.g., cool and/or ambient air) to the external surfaces of the returning coolant reservoirs to thereby cool the heated coolant(s) stored therein. In some instance, the ancillary module 170 may also include one or more cooling fans that are configured to force air directly to one or more components of the opto-fluidic instrument 120 so as to cool one or more components. For example, the ancillary module 170 may include cooling fans that are configured to directly cool by forcing ambient air past the system controller 130 to thereby cool the same system controller 130.

As discussed above, the opto-fluidic instrument 120 may include an optics module 150 which include the various optical components of the opto-fluidic instrument 120, such as but not limited to a camera, an illumination module (e.g., including one or more LEDs and/or one or more lasers), an objective lens 230, and/or the like. The optics module 150 may be a fluorescence imaging system that is configured to image the fluorescence emitted by the probes (e.g., oligonucleotides) in the sample 110 after the probes are excited by light from the illumination module of the optics module 150.

In various embodiments, the system controller 130 may be configured to control the operations of the opto-fluidic instrument 120 (e.g., and the operations of one or more modules thereof). In some instances, the system controller 130 may take various forms, including a processor, a single computer (or computer system), or multiple computers in communication with each other. In various embodiments, the system controller 130 may be communicatively coupled with a data storage, a set of input devices, a display system, or a combination thereof. In various embodiments, some or all of these components may be considered to be part of or otherwise integrated with the system controller 130, may be separate components in communication with each other, or may be integrated together. In other embodiments, the system controller 130 can be, or may be in communication with, a cloud computing platform.

In various embodiments, the opto-fluidic instrument 120 is configured to analyze the sample 110 and generate the output 190 that includes indications of the presence of the target molecules in the sample 110. For instance, with respect to the example embodiment discussed above where the opto-fluidic instrument 120 employs the SBH technique for detecting molecules, the opto-fluidic instrument 120 may perform a plurality of probing rounds on the sample 110. During the plurality of probing rounds, the sample 110 undergoes successive rounds of fluorescent probe hybridization (using two or more sets of fluorescent probes, where each set of fluorescent probes is excited by a different color channel) and is volumetrically imaged in a plurality of z-stacks to detect target molecules in the probed sample 110 in three dimensions. In such cases, the output 190 may include a plurality of light signals at specific three-dimensional locations over the plurality of probing cycles. In various embodiments, an optical signature (e.g., a codeword) specific to each gene is determined from the detected optical signals at each three-dimensional location across the plurality of probing cycles, which allows the identification of the target molecules.

Figure 2A:
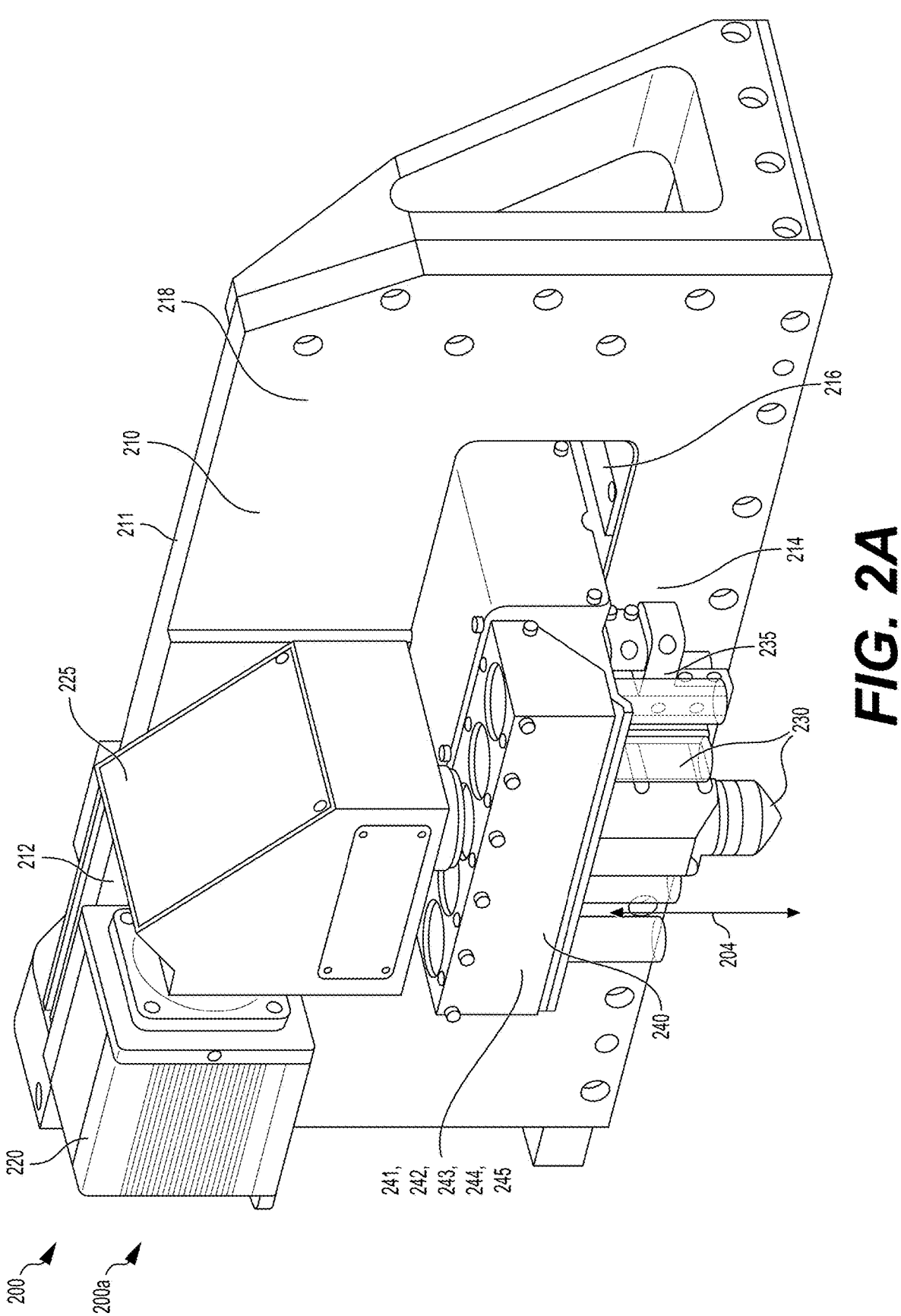
FIGS. 2A, 2B, 2C, 2D, and 2E are schematic illustrations of an optics module, in accordance with various embodiments.
Figure 2B:
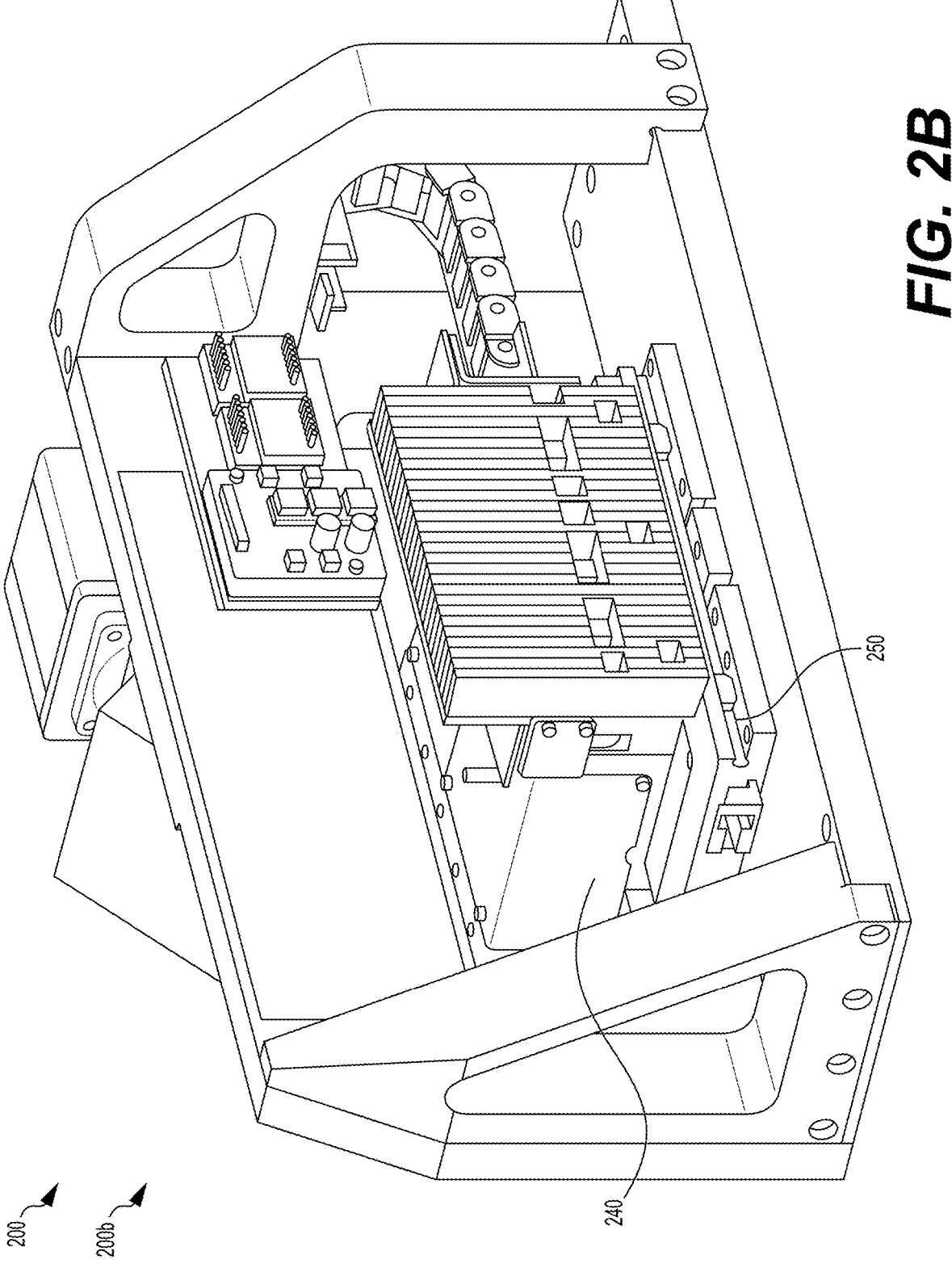

FIGS. 2A, 2B, 2C, 2D, and 2E are schematic illustrations 200a, 200b, 200c, 200d, and 200e, respectively, of an optics module 200, in accordance with various embodiments. As disclosed herein, the optics module 200 can be implemented within an analytical system (e.g., an opto-fluidic instrument, such as an in-situ analysis system) configured for imaging of biological specimens. As shown in FIGS. 2A and 2B, the schematic illustrations 200a and 200b are perspective views of the optics module 200, in accordance with various embodiments. As shown in FIG. 2A, the optics module 200 includes an optical mounting plate 210 having a first mounting surface 212, a second mounting surface 214, and an aperture 216 disposed between the first mounting surface 212 and the second mounting surface 214. In various embodiments, the optics module 200 includes a sensor array 220 disposed on the first mounting surface 212, an objective lens 230 disposed on the second mounting surface 214, and an illumination assembly 240 arranged within the aperture 216. In various embodiments, the illumination assembly 240 is disposed between the sensor array 220 and the objective lens 230.

Figure 2C:
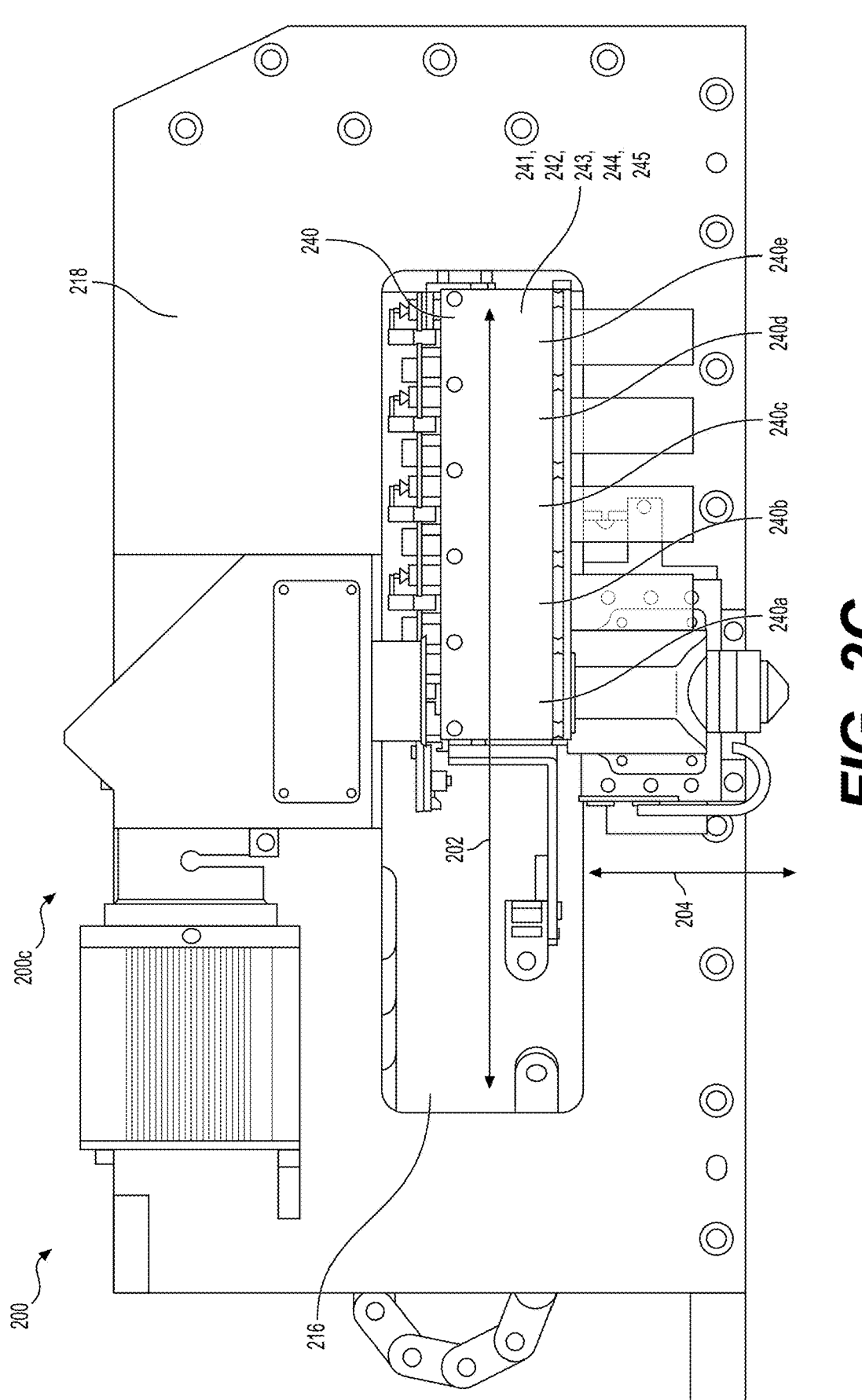
Figure 2D:
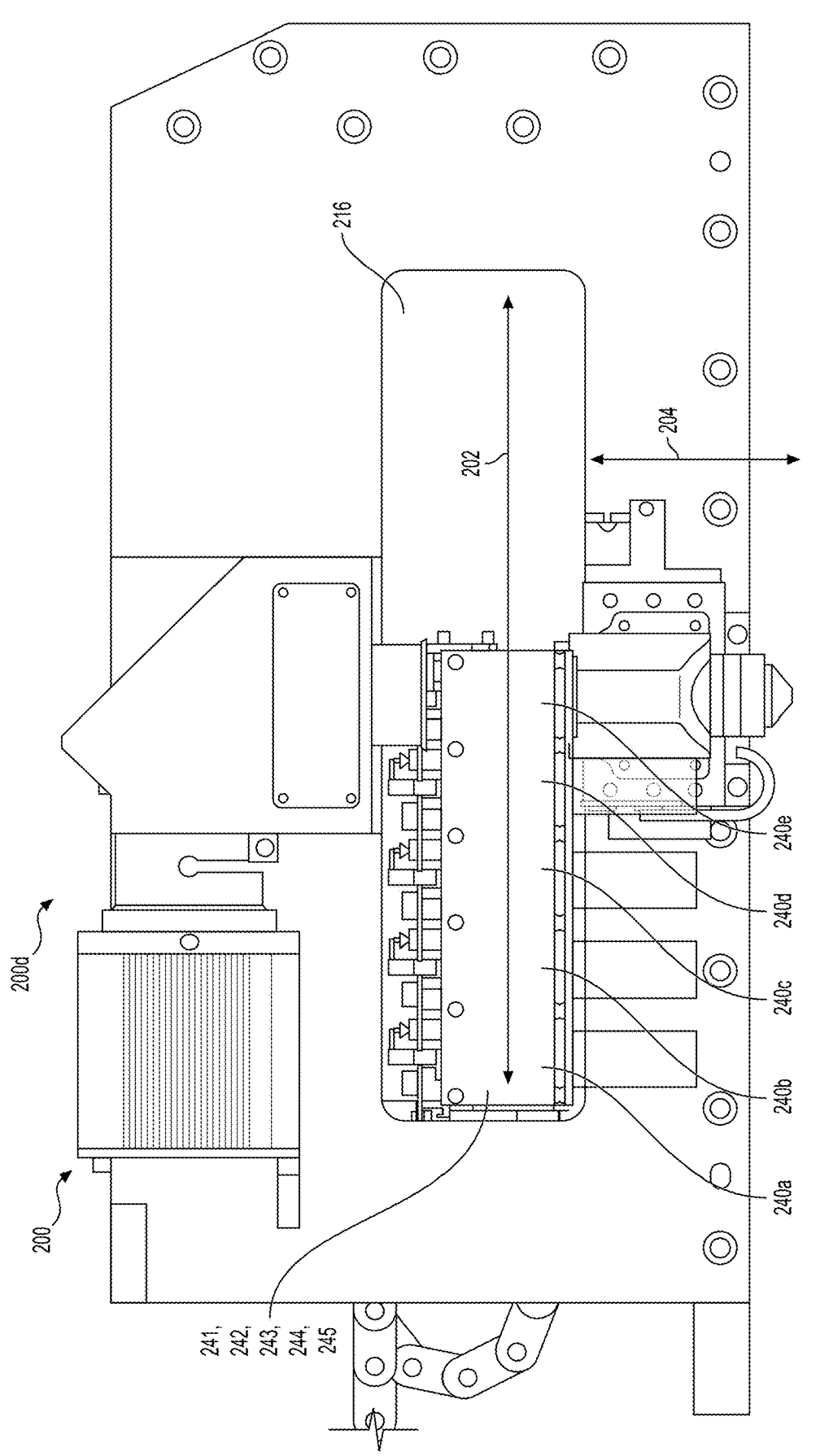

In various embodiments, the illumination assembly 240 is operable to move in a first direction 202 (e.g., X-direction or Y-direction) with respect to the objective lens 230 and the sensor array 220, as shown in FIGS. 2C and 2D. In various embodiments, the objective lens 230 is mounted on one or more stage 235 (e.g., a linear stage) coupled to the second mounting surface 214 of the optical mounting plate 210. In various embodiments, the objective lens 230 is mounted on the stage 235 such that it is operable to move with respect to the illumination assembly 240 in a second direction 204 (e.g., Z-direction). In various embodiments, the stage 235 is operable to move in the second direction 204 in order to move the objective lens 230 toward or away from a sample 110 and adjust a focal plane of the objective lens 230. In various embodiments, the second direction 204 is orthogonal to the first direction 202, as shown in FIGS. 2C and 2D.

In various embodiments, the optics module 200 can include mirror assembly 225 configured for directing reflected light from the objective lens 230 to the sensor array 220 for capturing an image. In various embodiments, the mirror assembly 225 includes a kinematic fold mirror. In various embodiments, the mirror assembly 225 includes a tube lens configured to form an image from an infinity-corrected objective (e.g., objective lens 230) on the sensor array 220.

In various embodiments, the optical mounting plate 210 has a thickness 211 between about 10 mm and about 100 mm. In various embodiments, the thickness 211 is about 18.55 mm. In various embodiments, the first mounting surface 212 extends from a first side 218 and the second mounting surface 214 extends from the first side 218. In various embodiments, the first mounting surface 212 is substantially planar. In various embodiments, the second mounting surface 214 is substantially planar. In various embodiments, the first mounting surface 212 and the second mounting surface 214 are planar with one another. In various embodiments, the first mounting surface 212 and the second mounting surface 214 are machined during a single pass of a machining tool so that the surfaces are planar with one another. In various embodiments, the first mounting surface 212 and/or the second mounting surface 214 extends about 5 mm to about 6 mm orthogonally from the first side 218.

In various embodiments, the optical mounting plate 210 can include a base having a first side 218, a second side, and a thickness 211 therebetween. In various embodiments, the first side 218 defines a first plane; a first mounting surface 212 extending from the first side 218; a second mounting surface extending from the first side 218, wherein the first mounting surface 212 and the second mounting surface 214 are substantially planar and define a second plane that is parallel to the first plane, wherein the optical alignment plate comprises an aperture 216 between the first mounting portion and the second mounting portion. In various embodiments, an orthogonal distance between the first plane and the second plane can be about 1 mm to about 100 mm. In various embodiments, the orthogonal distance between the first plane and the second plane can be between about 4 mm and about 10 mm. In various embodiments, the orthogonal distance between the first plane and the second plane can be about 5.63 mm.

In various embodiments, the optical mounting plate 210 can be produced via a method may include providing a base plate having a first side 218, a second side, and a thickness 211 therebetween. The method may also include forming a first mounting surface 212 and a second mounting surface 214 by removing and/or adding material on the first side 218; forming an aperture 216 in the base plate; anodizing the base plate; and forming a second plane on the first mounting surface 212 and the second mounting surface 214 after anodization. In various embodiments, the method can include forming one or more alignment bores in each of the first mounting surface 212 and the second mounting surface 214.

As shown in FIGS. 2B, 2C, and 2D, the illumination assembly 240 can be mounted on one or more stage 250. In various embodiments, the stage 250 is operable to move in the first direction 202, in various embodiments. In various embodiments, the stage 250 includes a voice coil actuator. As depicted in schematic illustrations 200a, 200c, and 200d of FIGS. 2A, 2C, and 2D, the illumination assembly 240 is configured to move between a first position 240a, a second position 240b, a third position 240c, a fourth position 240d, a fifth position 240e, and/or any suitable number of positions for illuminating a sample 110 using a first light unit 241, a second light unit 242, a third light unit 243, a fourth light unit 244, a fifth light unit 245, and/or any suitable number of light units. FIG. 2C depicts schematic illustration 200c where the illumination assembly 240 is at the first position 240a for illuminating the sample (e.g., such as sample 110) using the first light unit 241 and FIG. 2D depicts schematic illustration 200d where the illumination assembly 240 is at another position, e.g., the second position, 240b, the third position 240c, the fourth position 240d, or the fifth position 240e, for illuminating the sample 110 using any of the second light unit 242, the third light unit 243, the fourth light unit 244, or the fifth light unit 245.

Figure 2E:
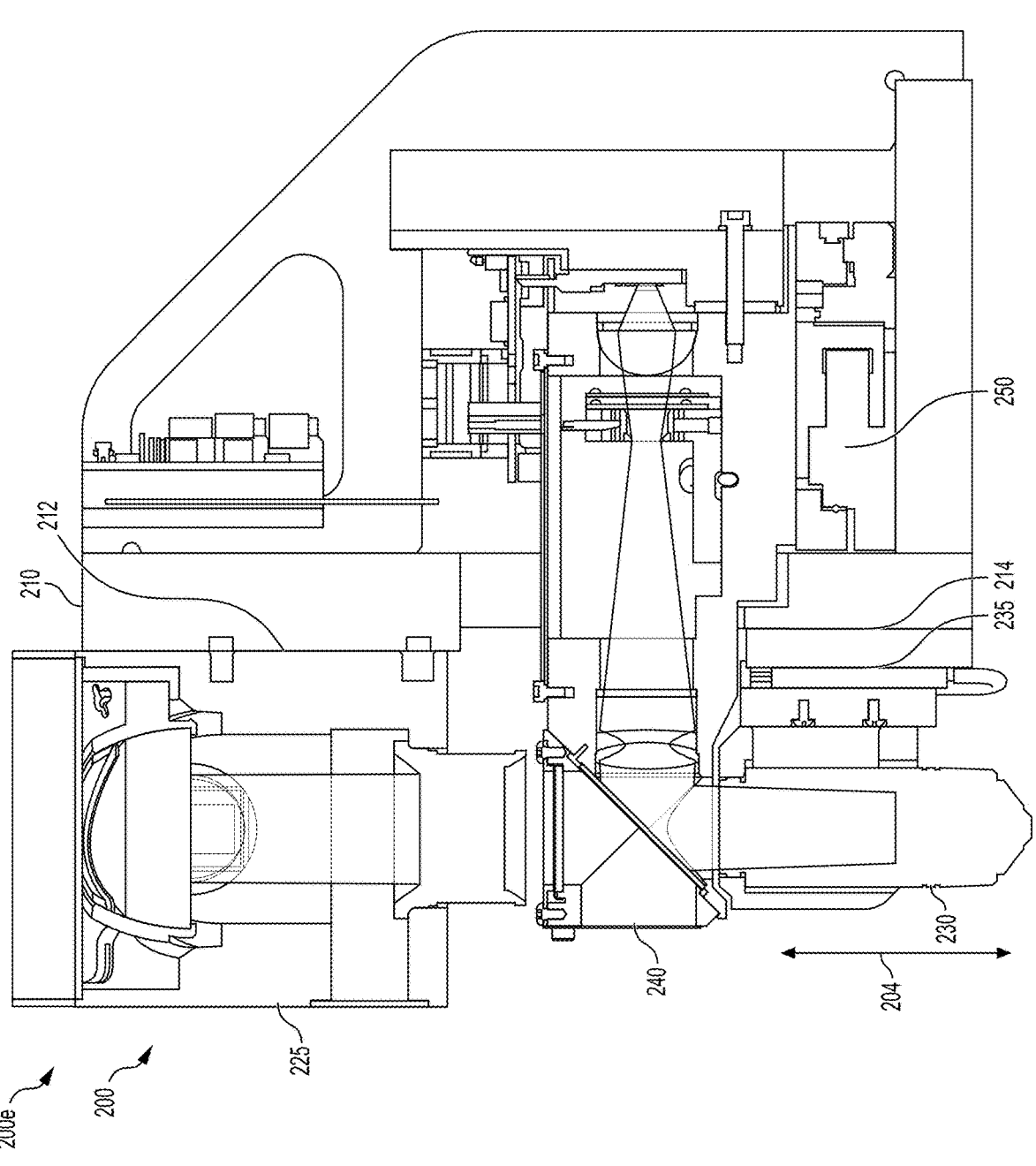

FIG. 2E shows a schematic illustration 200e, which is a cross-sectional side view of the optics module 200, in accordance with various embodiments. FIG. 2E illustrates the sensor array 220 mounted on the first mounting surface 212 of the optical mounting plate 210, the objective lens 230 mounted on the second mounting surface 214, and the illumination assembly 240 mounted in between the first mounting surface 212 and the second mounting surface 214. As illustrated in FIG. 2E, the objective lens 230 is mounted on the stage 235 operable to move along the second direction 204, whereas the illumination assembly 240 is mounted on the stage 250, which enables movement in-and-out of the plane of the figure.

Figure 3A:
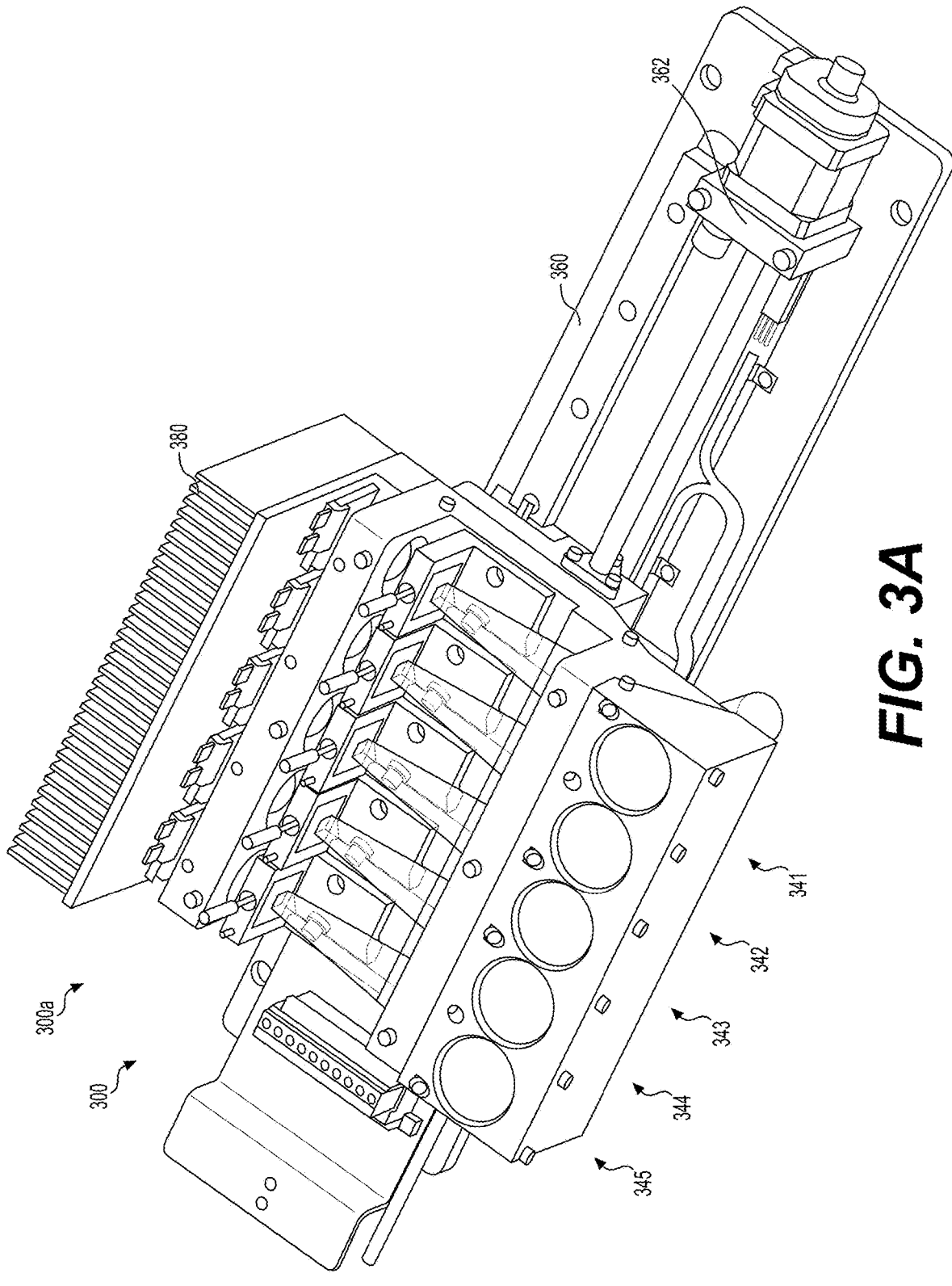
FIGS. 3A, 3B, 3C, 3D, 3E, and 3F are schematic illustrations of an illumination assembly, in accordance with various embodiments.

FIGS. 3A, 3B, 3C, 3D, 3E, and 3F are schematic illustrations 300a, 300b, 300c, 300d, 300e, and 300f, respectively, of an illumination assembly 300, in accordance with various embodiments. As shown in the figures, the illumination assembly 300 includes a plurality of light units, illustrated as light units 341, 342, 343, 344, 345, in accordance with various embodiments. In other embodiments, the number of light units 341, 342, 343, 344, 345 can vary from two to any suitable number of light units 341, 342, 343, 344, 345 that can be included in the illumination assembly 300. In various embodiments, the illumination assembly 300 has four light units 341, 342, 343, 344 corresponding to red, yellow, green, and/or blue wavelengths. In various embodiments, the illumination assembly 300 has five light units 341, 342, 343, 344, 345 corresponding to red, yellow, green, blue, and ultraviolet (e.g., near ultraviolet of 300 nm to 400 nm) wavelengths. As shown in FIG. 3A, the illumination assembly 300 is mounted on a stage 360, which enables movement of the illumination assembly 300 so as to position itself at a specific position with respect to other optical components, for example, of an imaging system or an apparatus, similar to the illustrations described above with respect to FIGS. 2C and 2D. In various embodiments, the stage 360 can be a linear stage 362 that can include a motor, such as a stepper motor and a screw drive shaft.

Schematic illustration 300a illustrated in FIG. 3A includes a heat sink 380 (e.g., passive heat sink) coupled to the light units 341, 342, 343, 344, 345. In various embodiments, the heat sink 380 has a plurality of fins for removing heat from heat sources of the light units 341, 342, 343, 344, 345. In various embodiments, the heat sink 380 can be made of aluminum or copper, or any suitable material that can efficiently conduct and dissipate heat into a working fluid. In various embodiments, the working fluid includes ambient air. In various embodiments, the working fluid includes water, deionized water, propylene glycol, and/or ethylene glycol. In various embodiments, heat transfer between the heat sink 380 and the working fluid (e.g., ambient air) is passive, as shown in FIG. 3A.

Figure 3B:
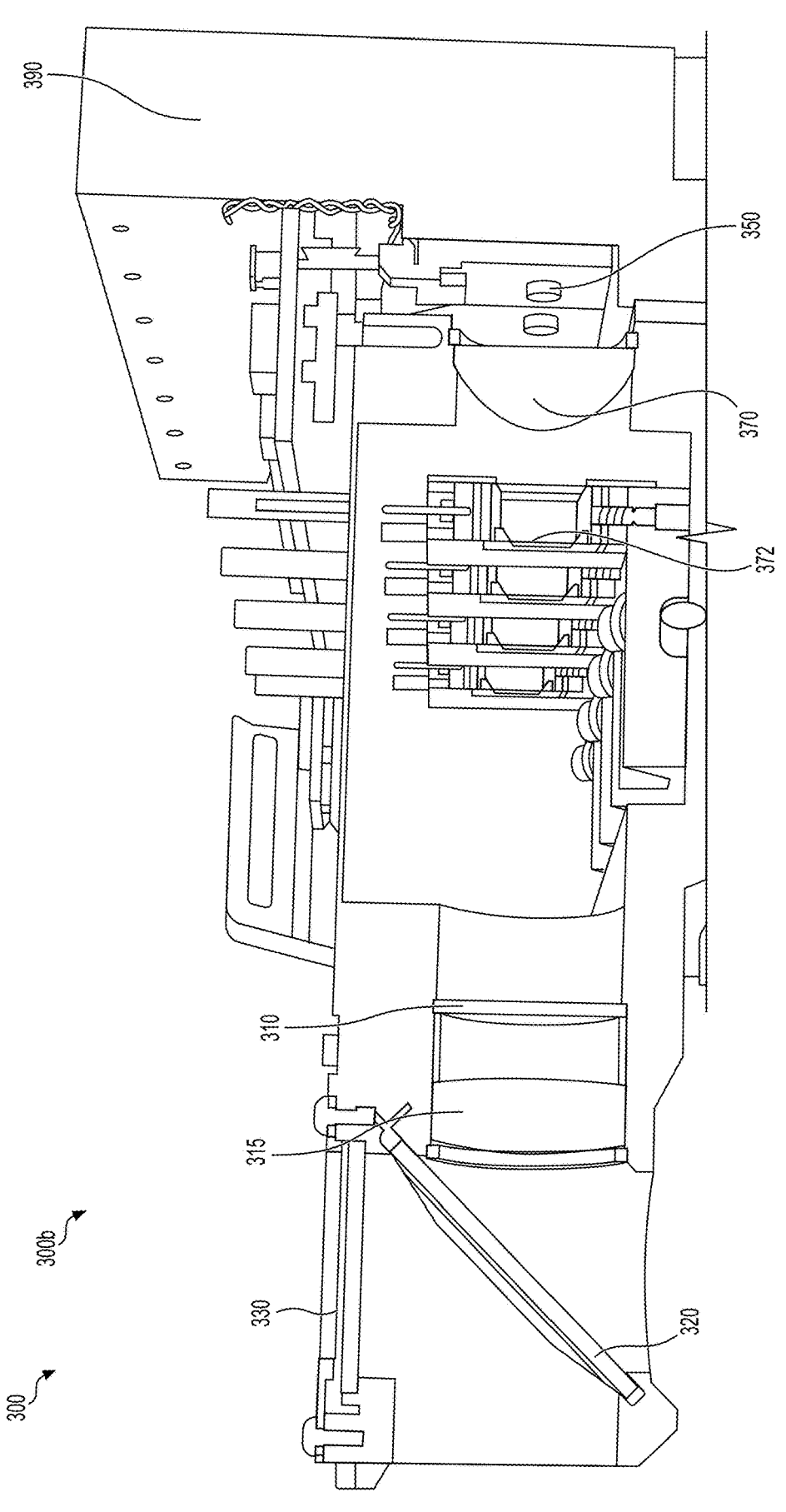
Figure 3C:
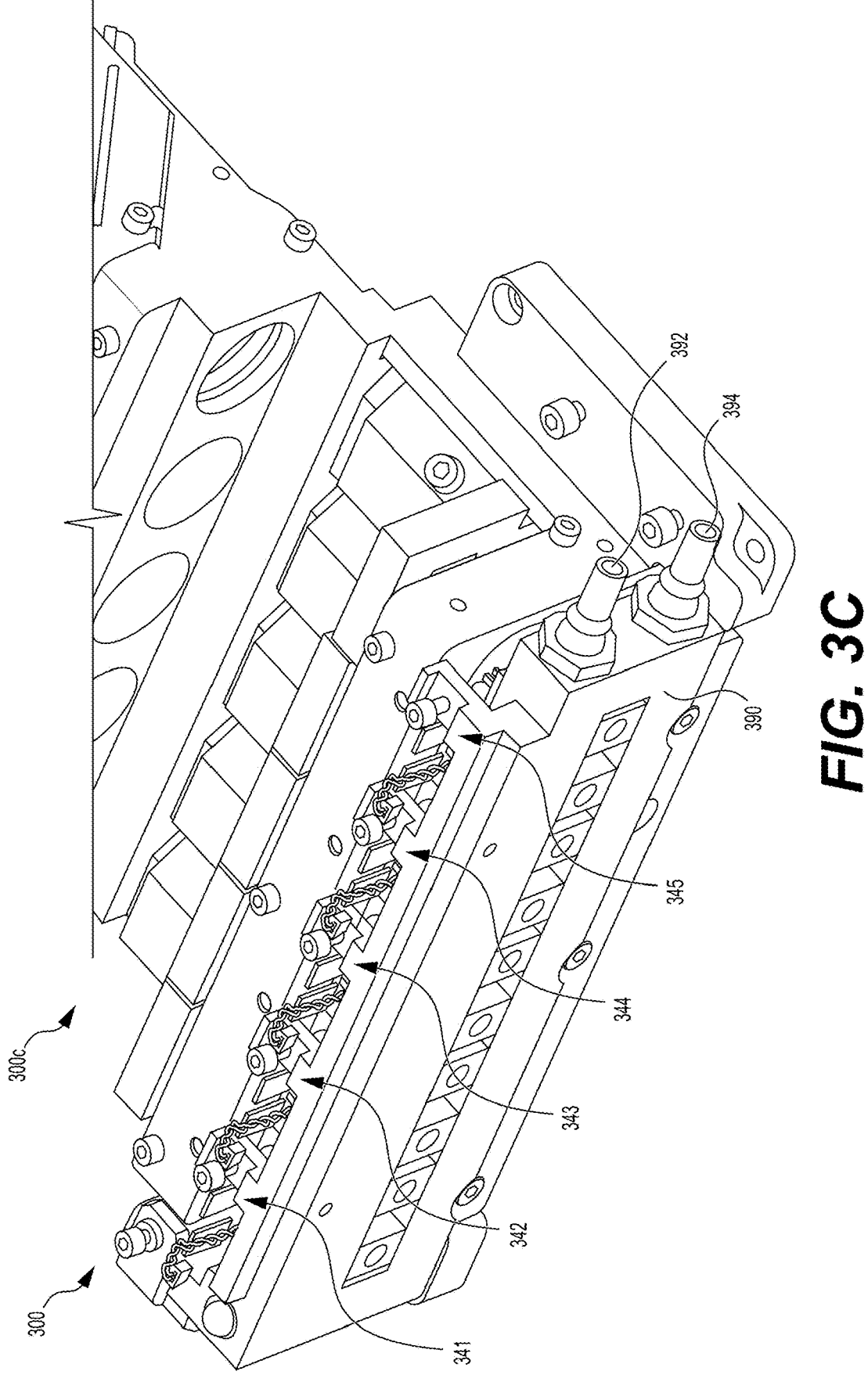

FIGS. 3B and 3C are schematic illustrations 300b and 300c of the illumination assembly 300, in accordance with various embodiments. FIG. 3B depicts a cross-sectional side view of the illumination assembly 300, which includes a heat sink 380 coupled to a light source 350, a collimating lens 370 configured to collimate light coming from the light source 350, an adjustable aperture 372 (e.g., a field stop) configured to regulate the beam of light, an excitation filter 310, a condensing lens 315, a beam splitter/dichroic mirror 320 (e.g., a dichroic mirror), and/or an emission filter 330, in accordance with various embodiments. In various embodiments, each of the light units 341, 342, 343, 344, 345 can include a light source 350, a collimating lens 370 configured to collimate light coming from the light source 350, an adjustable aperture 372 configured to regulate the beam of light, an excitation filter 310, a condensing lens 315, a beam splitter/dichroic mirror 320 (e.g., a cube beam splitter or a plate beam splitter), and/or an emission filter 330. In various embodiments, the beam splitter/dichroic mirror 320 is a dichroic mirror 320. In various embodiments, the adjustable aperture 372 is configured to block off-axis rays passing through the center of the aperture stop (e.g., the chief rays).

Figure 3D:
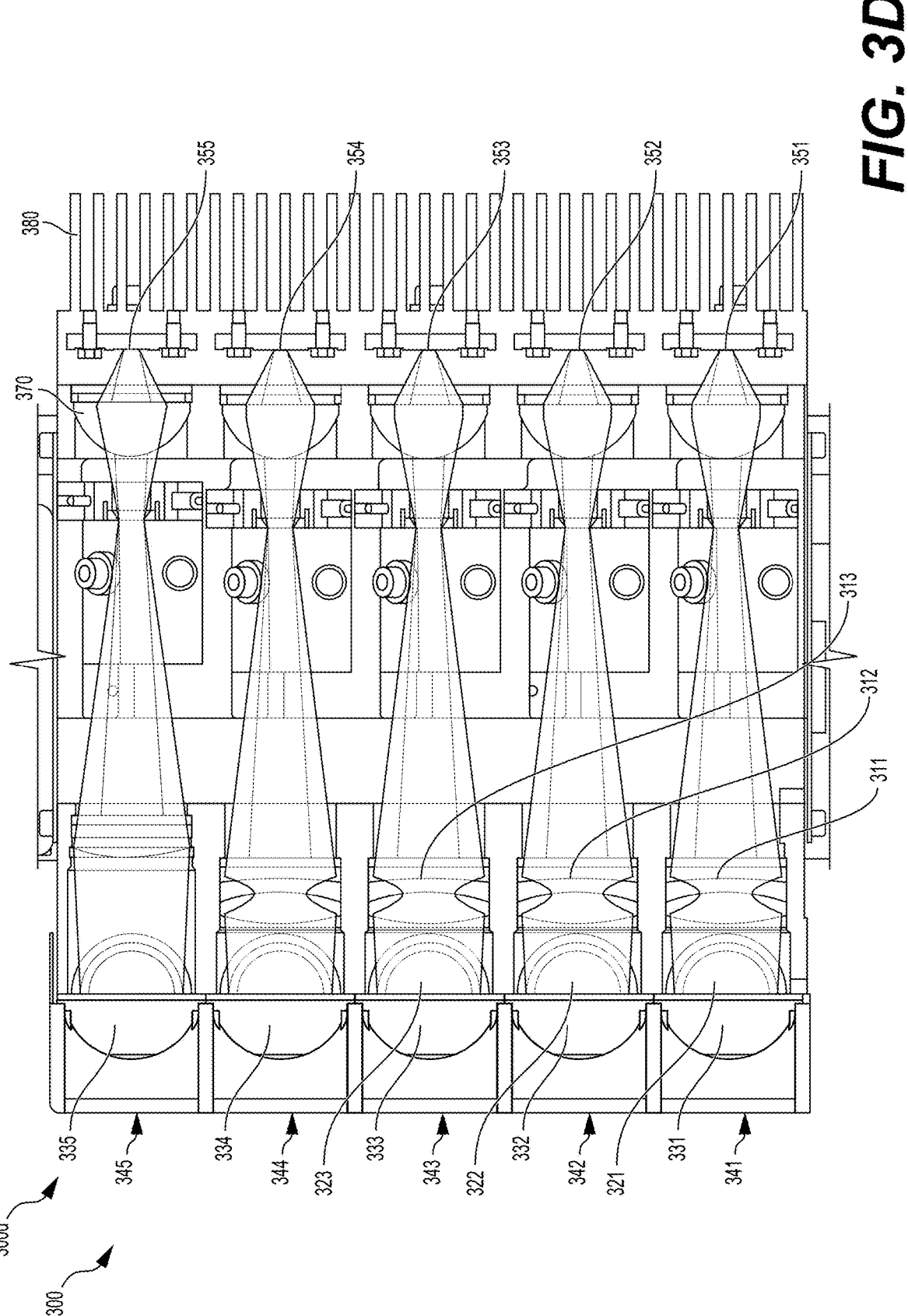
Figure 3E:
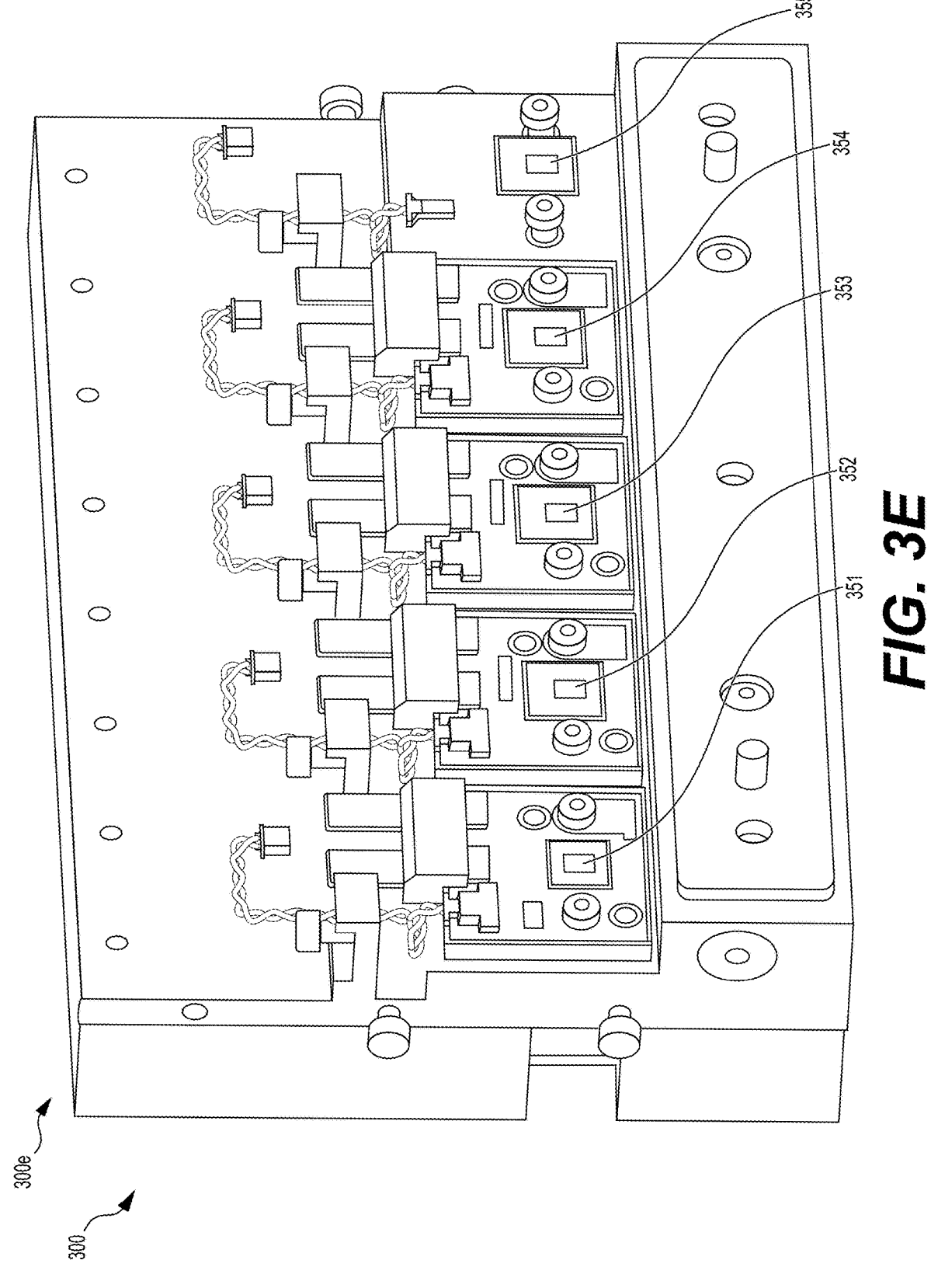
Figure 3F:
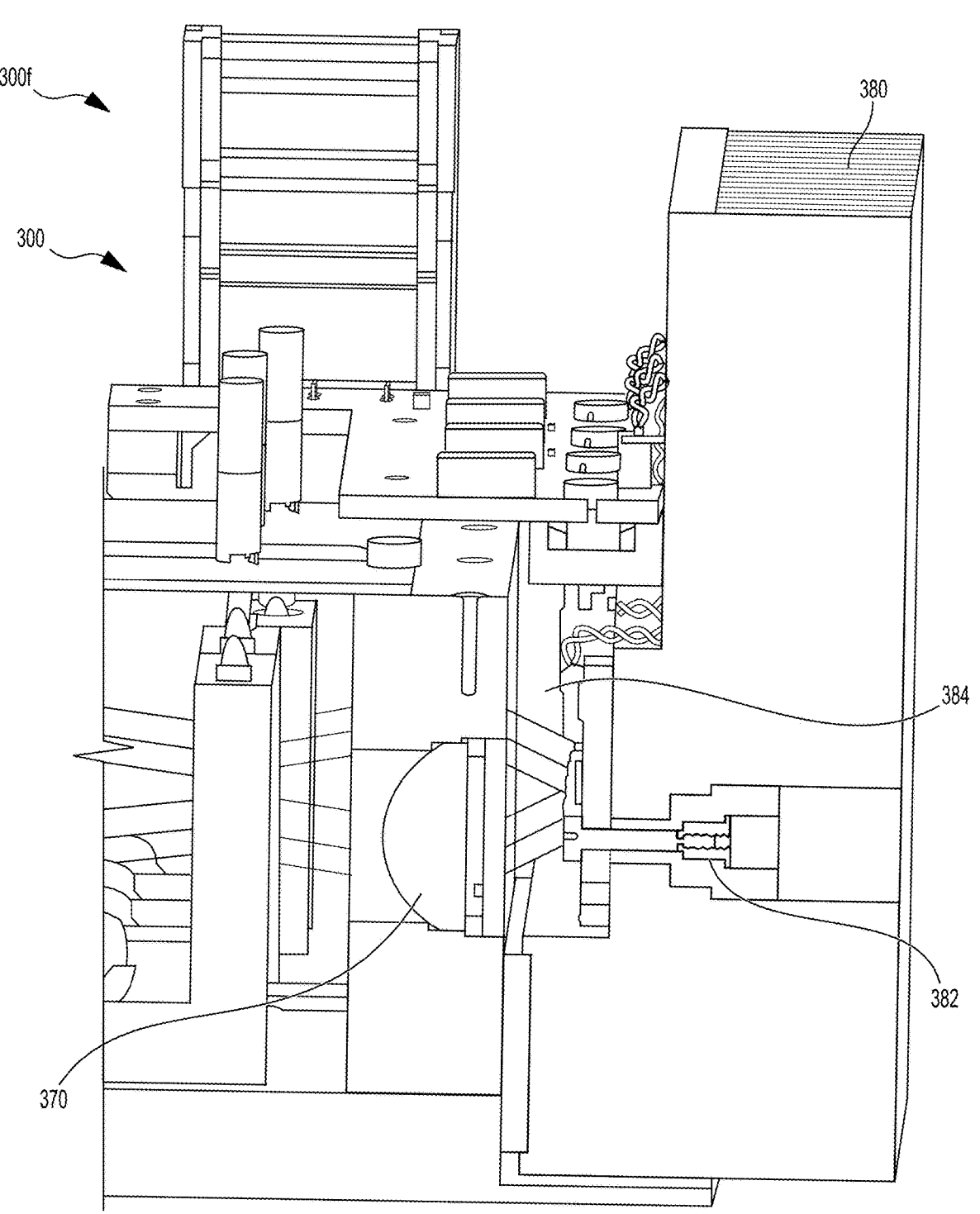

In various embodiments, the light source 350 from each of the light units 341, 342, 343, 344, 345 can be electrically isolated from one another via a gasket 382, as shown in FIG. 3F. In various embodiments, each of the light units 341, 342, 343, 344, 345, are electrically isolated from one another. In various embodiments, electrical isolation prevents unwanted electrical interactions between light units 341, 342, 343, 344, 345 powered with high currents (e.g., at least 18 amps). In various embodiments, the light source 350 from each of the light units 341, 342, 343, 344, 345 can include a light emitting diode (LED). In various embodiments, each of the light sources 351, 352, 353, 354, 355 is capable of operating at a supplied electrical current between 15 amperes and 30 amperes, between 18 amperes and 28 amperes, between 20 amperes and 25 amperes, or the like. In various embodiments, the illumination assembly 300 includes a cooling mechanism, such as the heat sink 380 or the cooling module 390, to maintain the light units 341, 342, 343, 344, 345 at suitable operating temperatures as heat is generated during operation of each light unit.

In various embodiments, heat transfer between the heat sink 380 and the working fluid is assisted, for example, via a fan or pump. In various embodiments, the heat sink 380 can have a plurality of fins immersed in the working fluid for removing heat from the light sources 351, 352, 353, 354, 355 of the light units 341, 342, 343, 344, 345 when they are run at a supplied electrical current, e.g., between 15 amperes and 30 amperes. In other words, the heat sink 380 is fluid-cooled to efficiently remove heat from the light source 350 by flowing the working fluid via an inlet 392 and an outlet 394 of the cooling module 390.

In various embodiments, the heat sink 380 can be maintained at a temperature or within a preset range of temperatures. For example, the heat sink 380 can be configured to maintain the temperature of the light source 351, 352, 353, 354, 355 at or about 0° C., 1° C., 2° C., 3° C., 4° C., 5° ° C., 6° ° C., 7° C., 8° C., 9° C., 10° C., 11° C., 12° C., 13° C., 14° C., 15° C., 16° C., 17° C., 18° C., 19° C., 20° C., 21° C., 22° C., 23° C., 24° C. or 25° C. In various embodiments, the heat sink 380 can be configured to maintain a range of temperature of the light source 351, 352, 353, 354, 355 between about 0° C. and about 25° C., between about 5° C. and about 25° C., between about 10° C. and about 25° C., between about 15° C. and about 25° C., between about 20° C. and about 25° C., between about 0° C. and about 20° C., between about 5° C. and about 20° C., between about 10° C. and about 20° C., between about 15° C. and about 20° ° C., between about 0° C. and about 15° C., between about 5° C. and about 15° C., between about 10° C. and about 15° C., inclusive of any temperature ranges therebetween.

In various embodiments, the light source 350 from each of the light units 341, 342, 343, 344, 345 can be thermally isolated from other components within each of the light units 341, 342, 343, 344, 345. For example, within the light unit 341, the light source 350 can be thermally isolated from all other components, such as, the collimating lens 370, the adjustable aperture 372, the excitation filter 310, the condensing lens 315, the beam splitter/dichroic mirror 320, and/or the emission filter 330. In various embodiments, the light source 350 is thermally isolated from other components via an insulating gasket 384, as depicted in FIG. 3F.

In various embodiments, each of the light units 341, 342, 343, 344, 345 can include a unique set of: light source 350, collimating lens 370, excitation filter 310, condensing lens 315, beam splitter/dichroic mirror 320, and/or emission filter 330, as shown in FIGS. 3B, 3D, and 3E. In various embodiments, each of the light units 341, 342, 343, 344, 345 can include a unique set of: light source 350, excitation filter 310, beam splitter/dichroic mirror 320, and emission filter 330. In various embodiments, each of the light units 341, 342, 343, 344, 345 can include a unique set of: light sources 351, 352, 353, 354, 355, and emission filters 331, 332, 333, 334, 335, as shown in FIGS. 3D and 3E. In various embodiments, the unique set for each of the light units 341, 342, 343, 344, 345 is selected such that there is less than about 5% crosstalk between received emissions at the sensor array 220, for example, from a set of fluorophores, for each of the light units 341, 342, 343, 344, 345.

In various embodiments, the illumination assembly 300 can include a first light unit 341 comprising a first emission filter 331 and a second light unit 342 comprising a second emission filter 332. In various embodiments, fluorophores and wavelength transmission profiles of the first and the second emission filters 331 and 332 are selected such that there is less than or equal to about 5% crosstalk between received emissions from a set of fluorophores.

In various embodiments, the illumination assembly 300 can include a first light unit 341 comprising a first emission filter 331, a second light unit 342 comprising a second emission filter 332, and a third light unit 343 comprising a third emission filter 333. In various embodiments, wavelengths of the first, the second, and the third emission filters 331, 332, 333 are selected such that there is less than about 5% crosstalk between received emissions from a set of fluorophores.

In various embodiments, the illumination assembly 300 can include a first emission filter 331, a second emission filter 332, a third emission filter 333, and a fourth emission filter 334. In various embodiments, wavelengths of the first, the second, the third, and the fourth emission filters 331, 332, 333, and 334 are selected such that there is less than about 5% crosstalk between received emissions from a set of fluorophores.

In various embodiments, the illumination assembly 300 can include a first light unit 341 and a second light unit 342, the first light unit 341 comprising a first excitation filter 311, a first dichroic mirror 321, and a first emission filter 331 and the second light unit 342 comprising a second excitation filter 312, a second dichroic mirror 322, and a second emission filter 332. In various embodiments, the first and the second excitation filters 311, 312, the first and the second dichroic mirrors 321, 322, and the first and the second emission filters 331, 332 are selected such that there is less than about 5% crosstalk between received emissions from a set of fluorophores.

In various embodiments, the illumination assembly 300 that includes a first light unit 341 having a first set of optical components comprising a first excitation filter 311, a first dichroic mirror 321, and a first emission filter 331 altogether configured for light emission at a first band of wavelengths, and a second light unit 342 having a second set of optical components comprising a second excitation filter 312, a second dichroic mirror 322, and a second emission filter 332 altogether configured for light emission at a second band of wavelengths. In various embodiments, the first and second sets of optical components of the illumination assembly 300 are selected such that the first band of wavelengths and the second band of wavelengths have less than 5% of crosstalk. In various embodiments, the first and second sets of optical components of the illumination assembly 300 are selected such that the first band of wavelengths and the second band of wavelengths have less than about 7%, about 10%, about 12%, about 15%, about 20% or about 25% of crosstalk. In various embodiments, the first and second sets of optical components of the illumination assembly 300 are selected such that the first band of wavelengths and the second band of wavelengths have between 0% and about 5%, between about 0% and about 7%, between about 0% and about 10%, between about 0% and about 15%, between about 0% and about 20%, between about 0% and about 25%, between about 3% and about 5%, between about 3% and about 7%, between about 3% and about 10%, between about 3% and about 15%, between about 3% and about 20%, or between about 3% and about 25%, of crosstalk.

In various embodiments, the first light unit 341 can also include a first light source 351 configured to produce light for exciting a fluorophore and the first excitation filter 311 has a first excitation band having a first minimum excitation wavelength and a first maximum excitation wavelength. In various embodiments, either of the first minimum excitation wavelength or the first maximum excitation wavelength can fall within about 10% of maximum intensity of light from the first light source 351. In various embodiments, the first emission filter 331 has a first emission band having a first minimum emission wavelength and a first maximum emission wavelength. In various embodiments, either of the first minimum emission wavelength or the first maximum emission wavelength can fall within about 50% of maximum emission intensity from the fluorophore. In various embodiments, the first maximum excitation wavelength of the first excitation filter 311 can be less than the first minimum emission wavelength of the first emission filter 331. In various embodiments, the first maximum excitation wavelength of the first excitation filter 311 can be equal or substantially equal to the first minimum emission wavelength of the first emission filter 331.

In various embodiments, the second light unit 342 can include a second light source 352 configured to produce light for exciting the fluorophore, wherein the second excitation filter 312 has a second excitation band having a second minimum excitation wavelength and a second maximum excitation wavelength. In various embodiments, either of the second minimum excitation wavelength or the second maximum excitation wavelength can fall within about 10% of maximum light intensity of light from the second light source 352. In various embodiments, the second emission filter 332 has a second emission band having a second minimum emission wavelength and a second maximum emission wavelength, either of the second minimum emission wavelength or the second maximum emission wavelength can fall within about 50% of maximum emission intensity from the fluorophore.

In various embodiments, the illumination assembly 300 can include a third light unit 343 having a third set of optical components comprising a third excitation filter 313, a third dichroic mirror 323, and a third emission filter 333 altogether configured for light emission at a third band of wavelengths. In various embodiments, the first, the second, and the third sets of optical components are selected such that the first, the second, and the third bands of wavelengths have less than 5% of crosstalk. In various embodiments, the first, the second, and the third sets of optical components are selected such that the first, the second, and the third bands of wavelengths have less than about 7%, about 10%, about 12%, about 15%, about 20% or about 25% of crosstalk. In various embodiments, the first, the second, and the third sets of optical components are selected such that the first, the second, and the third bands of wavelengths have between 0% and about 5%, between about 0% and about 7%, between about 0% and about 10%, between about 0% and about 20%, between about 0% and about 25%, between about 3% and about 5%, between about 3% and about 7%, between about 3% and about 10%, between about 3% and about 15%, between about 3% and about 20%, or between about 3% and about 25%, of crosstalk.

FIGS. 4A, 4B, 4C, 4D, 4E, 4F, and 4G are schematic illustrations 400a, 400b, 400c, 400d, 400e, 400f, and 400g of an illumination assembly 400, in accordance with various embodiments. As shown in perspective views of schematic illustrations 400a, 400b, and 400c, the illumination assembly 400 includes a plurality of light units, illustrated as light units 441, 442, 443, 444, 445, in accordance with various embodiments. In other embodiments, the number of light units 441, 442, 443, 444, 445 can vary from two to any suitable number of light units 441, 442, 443, 444, 445 that can be included in the illumination assembly 400.

As depicted in schematic illustrations 400a, 400b, 400c, and 400d, respectively, of FIGS. 4A, 4B, 4C, and 4D, each of the light units 441, 442, 443, 444, 445 include an excitation filter 410, a condensing lens 412, a beam splitter/dichroic mirror 420, and an emission filter 430. In various embodiments, each of the light units 441, 442, 443, 444, 445 can include a leaf monospring 436 configured for securing the emission filter 430. In various embodiments, each of the light units 441, 442, 443, 444, 445 can include a clamp 438 for further securing the emission filter 430.

Figure 4C:
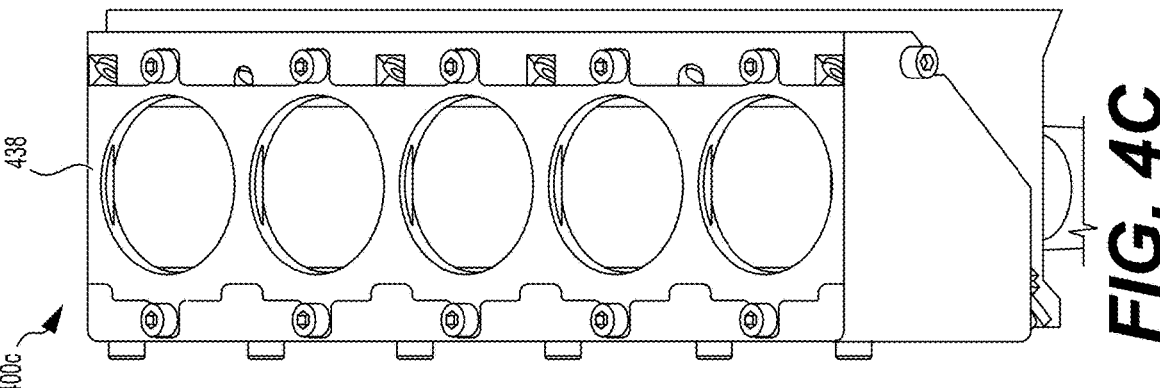
FIGS. 4A, 4B, 4C, 4D, 4E, 4F, and 4G are schematic illustrations of an illumination assembly, in accordance with various embodiments.
Figure 4B:
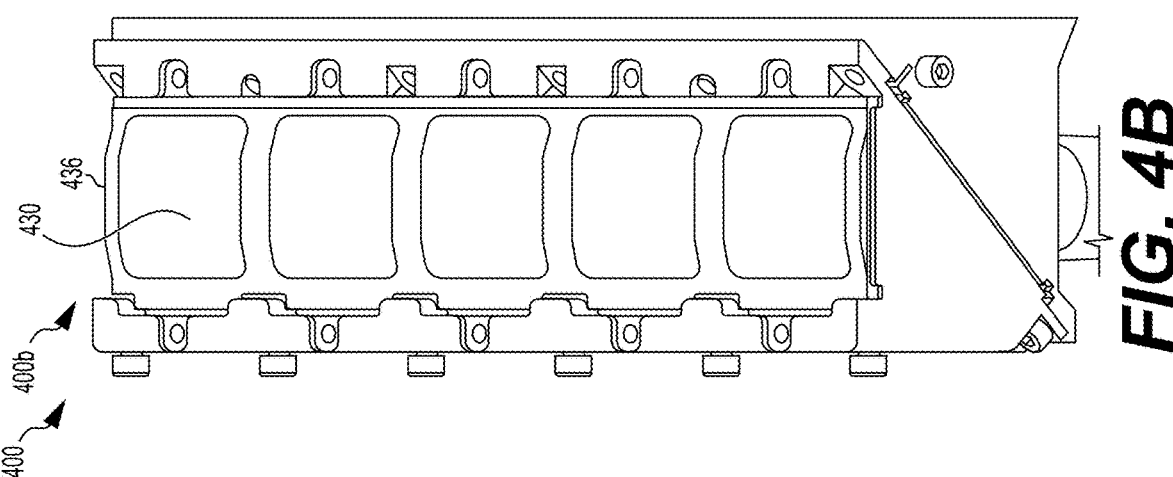
Figure 4A:
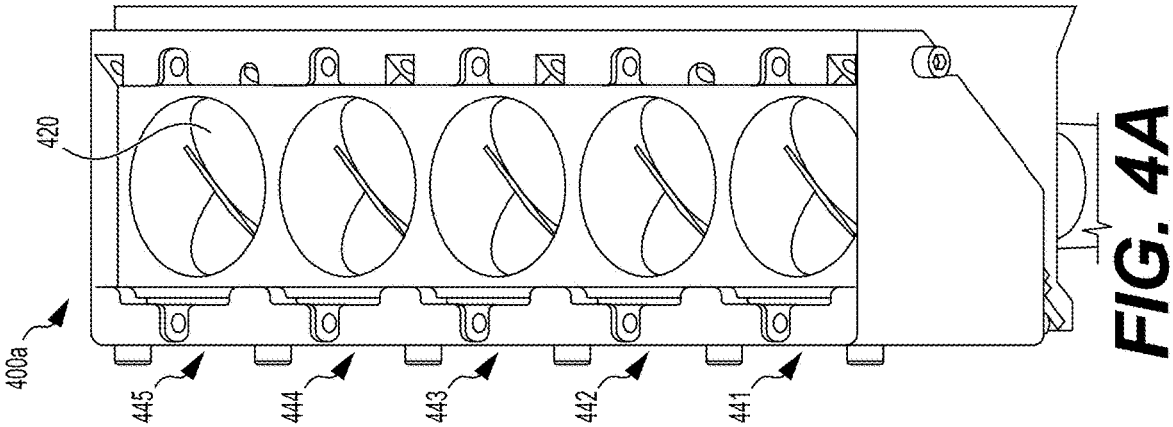
Figures 4D, 4E:
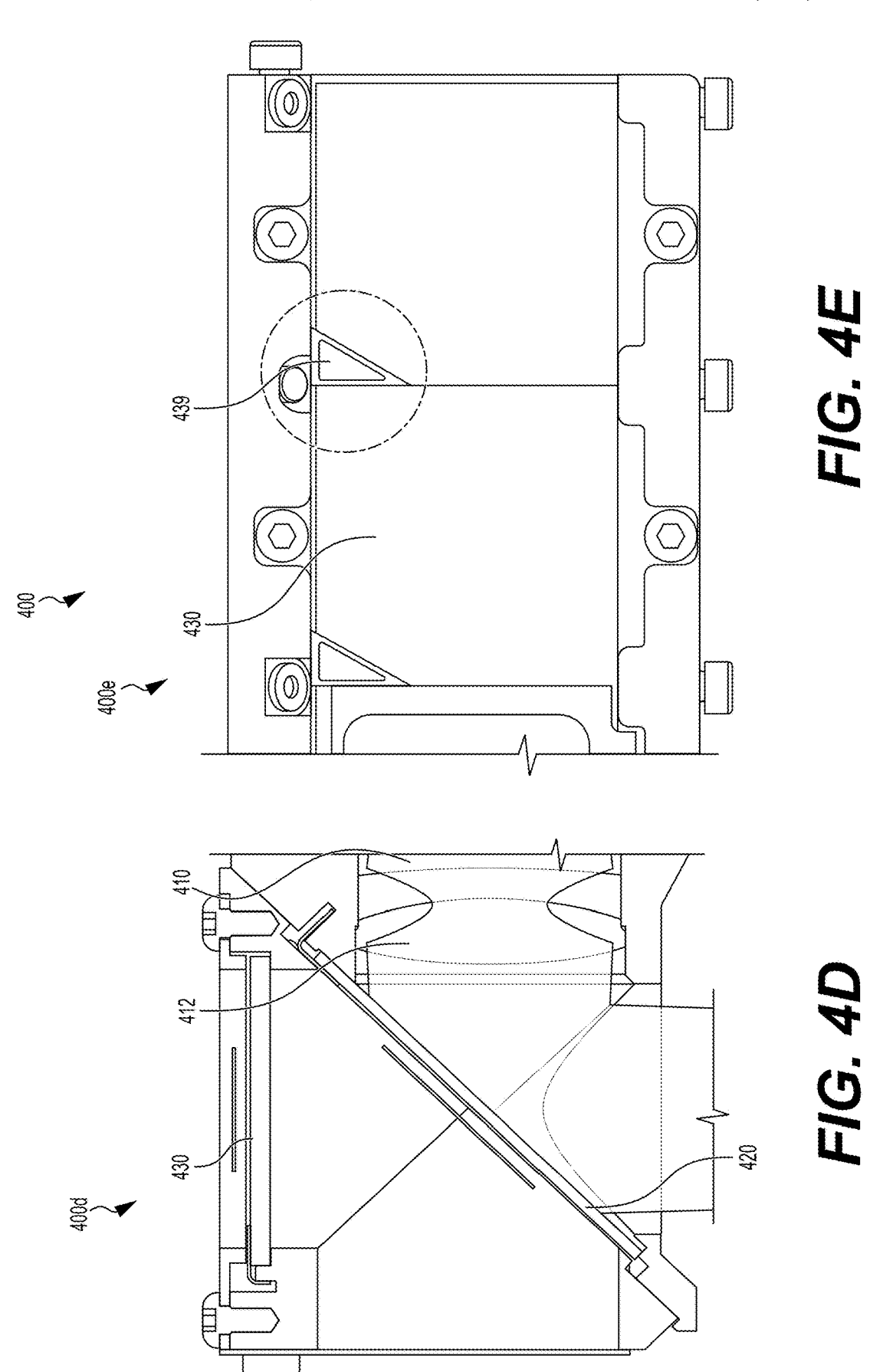
Figures 4F, 4G:
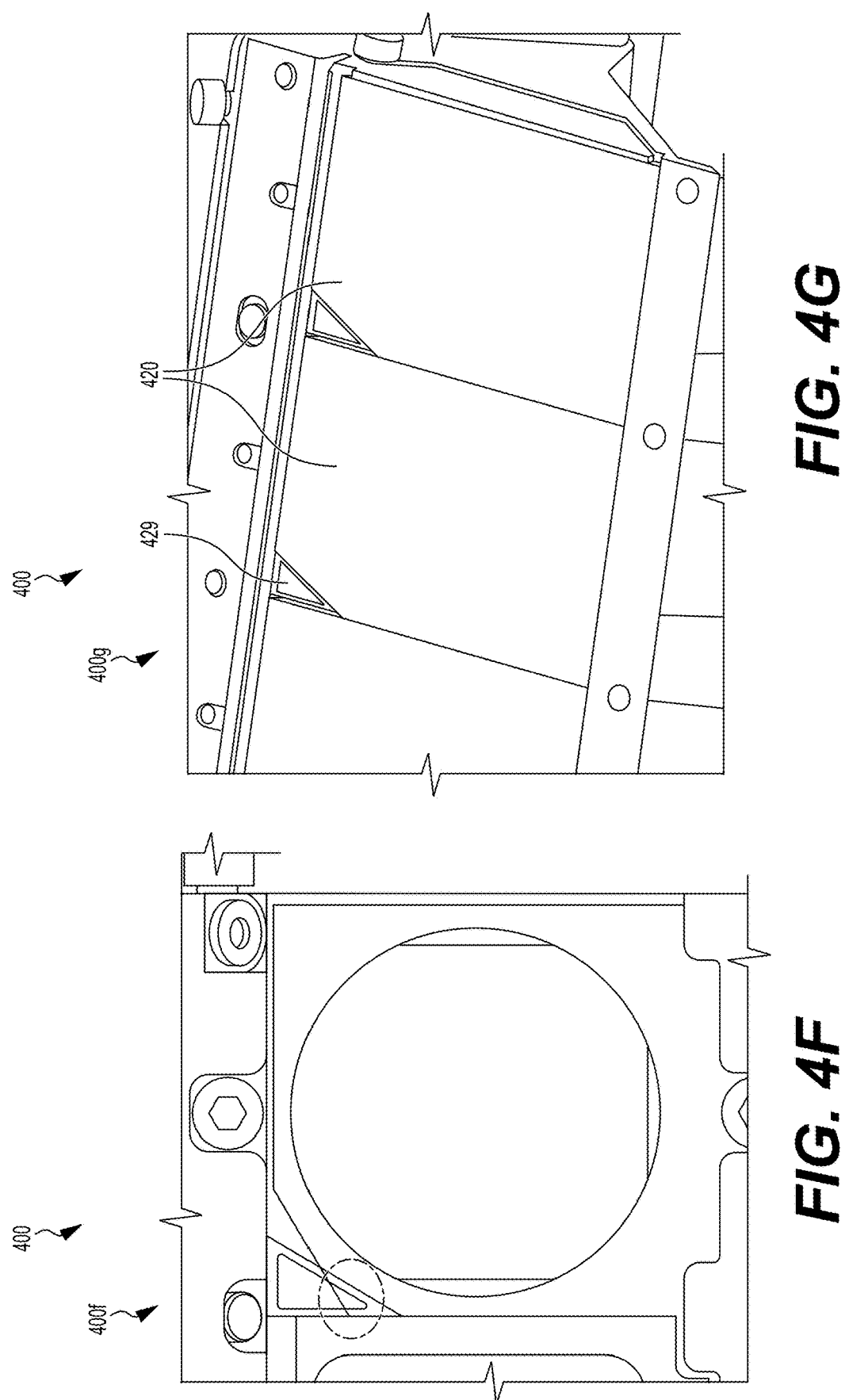

FIGS. 4E, 4F, and 4G depict schematic illustrations 400e, 400f, and 400g, which show how emission filter(s) 430 and beam splitter(s)/dichroic mirror(s) 420 can be secured, in accordance with various embodiments. As illustrated, in various embodiments, the emission filter 430 can include a notch 439 on a side of the emission filter so that it can be mounted correctly in a designated orientation, as shown in schematic illustration 400e of FIG. 4E. For comparison, schematic illustration 400f of FIG. 4F depict the emission filter 430 mounted incorrectly. FIG. 4G illustrates the beam splitter(s)/dichroic mirror(s) 420 that includes a notch 429 on a side of the beam splitter/dichroic mirror 420 so that it can be mounted correctly in a designated orientation, in accordance with various embodiments.

In various embodiments, the light units 441, 442, 443, 444, 445 include a red color channel, a yellow color channel, a green color channel, a blue color channel, and/or an ultraviolet (UV) color channel. In various embodiments, the red color channel has a dominant wavelength range of about 619 nm to about 630 nm. In various embodiments, the red color channel has a typical dominant wavelength of about 623 nm. In various embodiments, the green color channel has a dominant wavelength range of about 516 nm to about 540 nm. In various embodiments, the green color channel has a typical dominant wavelength of about 525 nm. In various embodiments, the blue color channel has a dominant wavelength range of about 450 nm to about 468 nm. In various embodiments, the blue color channel has a typical dominant wavelength of about 460 nm. In various embodiments, the yellow color channel has a center wavelength range of about 573 nm to about 585 nm. In various embodiments, the yellow color channel has a typical center wavelength of about 579 nm.

In various embodiments, the red color channel is configured to receive up to about 27 amps of continuous wave current. In various embodiments, the yellow color channel is configured to receive up to about 22.5 amps of continuous wave current. In various embodiments, the green color channel is configured to receive up to about 27 amps of continuous wave current. In various embodiments, the blue color channel is configured to receive up to about 27 amps of continuous wave current.

In various embodiments, the UV color channel has a peak wavelength range of about 365 nm to about 375 nm. In various embodiments, the UV color channel has a peak wavelength range of about 380 nm to about 390 nm. In various embodiments, the UV color channel has a peak wavelength range of about 400 nm to about 410 nm. In various embodiments, the UV color channel has a typical peak wavelength of about 369 nm. In various embodiments, the UV color channel has a typical peak wavelength of about 385 nm. In various embodiments, the UV color channel has a typical peak wavelength of about 405 nm. In various embodiments, the UV color channel is configured to emit light within a range from a minimum wavelength of about 380 nm to a maximum wavelength of about 385 nm. In various embodiments, the UV color channel is configured to emit at a peak wavelength of about 380 nm.

In various embodiments, the UV color channel is configured to receive up to about 18 amps of continuous wave current. In various embodiments, the UV color channel is configured to receive up to about 24 amps of continuous wave current.

In various embodiments, the excitation filter 310 and/or emission filter 330 includes one or more notch filters. In various embodiments, the excitation filter 310 and/or emission filter 330 includes one or more edge filters.

In various embodiments, transition width and edge steepness are two terms used to describe the spectral properties of filters. In various embodiments, transition width is the maximum distance between the laser line (where OD>6) and the 50% transmission point. In various embodiments, edge steepness is the actual distance between the place where OD>6 ends and the 50% transmission point. In various embodiments, transition width describes how far from the laser line a filter can be expected to transmit light. In various embodiments, edge steepness describes how fast the filter transitions from blocking to transmission. In various embodiments, transition width is greater than edge steepness. In various embodiments, blocking bands, transmission bands, and/or reflection bands are defined based on edge steepness. In various embodiments, transmission band is defined as the range of wavelengths where greater than 95% of light is transmitted in the passband. In various embodiments, reflection band is defined as the range of wavelengths where greater than 98% of light is reflected.

In various embodiments, the excitation filter 310 has a blocking band of about 300 nm to about 345 nm. In various embodiments, the excitation filter 310 has a blocking band of about 416 nm to about 700 nm. In various embodiments, the excitation filter 310 has a blocking band of about 350 nm to about 433 nm. In various embodiments, the excitation filter 310 has a blocking band of about 498 nm to about 800 nm. In various embodiments, the excitation filter 310 has a blocking band of about 350 nm to about 519 nm. In various embodiments, the excitation filter 310 has a blocking band of about 544 nm to about 800 nm. In various embodiments, the excitation filter 310 has a blocking band of about 350 nm to about 547 nm. In various embodiments, the excitation filter 310 has a blocking band of about 600 nm to about 800 nm. In various embodiments, the excitation filter 310 has a blocking band of about 350 nm to about 600 nm. In various embodiments, the excitation filter 310 has a blocking band of about 650 nm to about 800 nm.

In various embodiments, the excitation filter 310 has a transmission band of about 355 nm to about 411 nm. In various embodiments, the excitation filter 310 has a transmission band of about 443 nm to about 493 nm. In various embodiments, the excitation filter 310 has a transmission band of about 529 nm to about 539 nm. In various embodiments, the excitation filter 310 has a transmission band of about 557 nm to about 595 nm. In various embodiments, the excitation filter 310 has a transmission band of about 610 nm to about 645 nm.

In various embodiments, the emission filter 330 has a blocking band of about 300 nm to about 416 nm. In various embodiments, the emission filter 330 has a blocking band of about 493 nm to about 700 nm. In various embodiments, the emission filter 330 has a blocking band of about 350 nm to about 498 nm. In various embodiments, the emission filter 330 has a blocking band of about 539 nm to about 800 nm. In various embodiments, the emission filter 330 has a blocking band of about 350 nm to about 544 nm. In various embodiments, the emission filter has a blocking band of about 591 nm to about 800 nm. In various embodiments, the emission filter 330 has a blocking band of about 350 nm to about 600 nm. In various embodiments, the emission filter 330 has a blocking band of about 653 nm to about 800 nm. In various embodiments, the emission filter 330 has a blocking band of about 350 nm to about 650 nm. In various embodiments, the emission filter 330 has a blocking band of about 725 nm to about 800 nm.

In various embodiments, the emission filter 330 has a transmission band of about 421 nm to about 483 nm. In various embodiments, the emission filter 330 has a transmission band of about 503 nm to about 529 nm. In various embodiments, the emission filter 330 has a transmission band of about 549 nm to about 581 nm. In various embodiments, the emission filter 330 has a transmission band of about 605 nm to about 643 nm. In various embodiments, the emission filter 330 has a transmission band of about 655 nm to about 715 nm.

In various embodiments, the dichroic filter includes a reflection band of about 300 nm to about 411 nm. In various embodiments, the dichroic filter includes a reflection band of about 350 nm to about 493 nm. In various embodiments, the dichroic filter includes a reflection band of about 350 nm to about 539 nm. In various embodiments, the dichroic filter includes a reflection band of about 350 nm to about 595 nm. In various embodiments, the dichroic filter includes a reflection band of about 350 nm to about 645 nm.

In various embodiments, the dichroic filter includes a transmission band of about 421 nm to about 700 nm. In various embodiments, the dichroic filter includes a transmission band of about 503 nm to about 800 nm. In various embodiments, the dichroic filter includes a transmission band of about 549 nm to about 800 nm. In various embodiments, the dichroic filter includes a transmission band of about 605 nm to about 800 nm. In various embodiments, the dichroic filter includes a transmission band of about 655 nm to about 900 nm.

In various embodiments, the excitation filters 311, 312, 313 and/or the emission filters 331, 332, 333, 334, 335 have extended blocking band of OD2+ extending out to 1100 nm. In various embodiments, the combined excitation filters 311, 312, 313 and emission filter 331, 332, 333, 334, 335 provide combined OD10+ blocking across the entire visible range (e.g., 300-700 for NUV, 350-800 nm for all others).

IV. Example Embodiments Section

The reference numbers included in the example embodiments of the present disclosure are provided as nonlimiting examples of components referred to in such example embodiments. The components referred to in these embodiments are not meant to be exhaustive or to be limited to the example components indicated by the reference numbers. Many variations will be apparent to those of ordinary skill in the art without departing from the scope and spirit of the described labels of the various embodiments.

The embodiments disclosed herein with respect to FIGS. 2A-2E, 3A-3F, and 4A-4G relate to imaging systems and methods of implementing such imaging systems within an analytical system configured for imaging of biological specimens. In accordance with various embodiments, the imaging system, such as imaging system 200, may include an optical mounting plate, such as optical mounting plate 210 having a first portion, a second portion, and an aperture, such as aperture 216 disposed between the first portion and the second portion; an imaging sensor, such as sensor array 220, disposed on the first portion; an objective lens, such as objective lens 230, disposed on the second portion; and an illumination assembly, such as illumination assembly 240, illumination assembly 300, and/or illumination assembly 400 arranged within the aperture and disposed between the imaging sensor and the objective lens.

In various embodiments, the illumination assembly, such as illumination assembly 240, illumination assembly 300, and/or illumination assembly 400, can be configured such that it is operable to move in a first direction, such as first direction 202, with respect to the objective lens and the imaging sensor, and wherein the objective lens is operable to move with respect to the illumination assembly in a second direction, such as second direction 204, wherein the second direction is orthogonal to the first direction.

In various embodiments, the illumination assembly, such as illumination assembly 240, illumination assembly 300, and/or illumination assembly 400, can include a first light unit, such as light units 241, 341, and/or 441, comprising a first emission filter, such as emission filter 331, and a second light unit, such as light units 242, 342, and/or 442, comprising a second emission filter, such as emission filter 332. In various embodiments, wavelengths of the first and the second emission filters are selected such that there is less than about 5% crosstalk between received emissions from a set of fluorophores.

In various embodiments, the illumination assembly, such as illumination assembly 240, illumination assembly 300, and/or illumination assembly 400, can include a first light unit such as light units 241, 341, and/or 441, comprising a first emission filter, such as emission filter 331, a second light unit, such as light units 242, 342, and/or 442, comprising a second emission filter, such as emission filter 332, and a third light unit, such as light units 243, 343, and/or 443, comprising a third emission filter, such as emission filter 333. In various embodiments, wavelengths of the first, the second, and the third emission filters are selected such that there is less than about 5% crosstalk between received emissions from a set of fluorophores.

In various embodiments, the illumination assembly can include a first emission filter, a second emission filter, a third emission filter, and a fourth emission filter. In various embodiments, wavelengths of the first, the second, the third, and the third emission filters are selected such that there is less than about 5% crosstalk between received emissions from a set of fluorophores.

In various embodiments, the illumination assembly, such as illumination assembly 240, illumination assembly 300, and/or illumination assembly 400, can include a first light unit and a second light unit, the first light unit comprising a first excitation filter, a first dichroic mirror, and a first emission filter and the second light unit comprising a second excitation filter, a second dichroic mirror, and a second emission filter. In various embodiments, the first and the second excitation filters, the first and the second dichroic mirrors, and the first and the second emission filters are selected such that there is less than about 5% crosstalk between received emissions from a set of fluorophores.

In various embodiments, the imaging system can include a tube lens configured for guiding light reflected from the sample via the objective lens; and/or a kinematic fold mirror configured for redirecting the reflected light from the objective lens to the imaging sensor for capturing an image.

In various embodiments, the first light unit can include an excitation filter, wherein the excitation filter has an excitation band having a minimum excitation wavelength and a maximum excitation wavelength, either of which falls within about 10% of maximum intensity of light from the light source. In various embodiments, the first light unit can include an emission filter, wherein the emission filter has an emission band having a minimum emission wavelength and a maximum emission wavelength, either of which falls within about 50% of maximum emission intensity from the set of fluorophores. In various embodiments, the maximum excitation wavelength of the excitation filter is less than the minimum emission wavelength of the emission filter. In various embodiments, the maximum excitation wavelength of the excitation filter is equal or substantially equal to the minimum emission wavelength of the emission filter.

In various embodiments, the imaging system, such as imaging system 200 can include a cooling module, such as heat sink 390, coupled to the first light unit and the second light unit of the illumination assembly. In various embodiments, the cooling module can include a heat sink, such as heat sink 380 configured to transfer heat away from the first light source and the second light source via a working fluid that flows through the heat sink.

In various embodiments, the first light source, such as light sources 351, can include a first light emitting diode (LED) and the second light source, such as light sources 352, can include a second LED. In various embodiments, the first LED and the second LED can be electrically isolated from one another. In various embodiments, the first LED and the second LED are each capable of operating at a supplied electrical current between 15 amperes and 30 amperes, between 18 amperes and 28 amperes, between 20 amperes and 25 amperes, or the like.

In various embodiments, the first LED is thermally isolated from the first emission filter, the first dichroic mirror, and the first emission filter of the first light unit via an insulating gasket. In various embodiments, the second LED is thermally isolated from the second emission filter, the second dichroic mirror, and the second emission filter of the second light unit via the insulating gasket.

In accordance with various embodiments, a system for imaging is described. In various embodiments, the system includes a sensor array configured for imaging a sample; an objective lens assembly optically coupled to the sensory array; an illumination assembly disposed between the sensor array and the objective lens assembly, the illumination assembly comprising a plurality of light units with each light unit comprising a light source and a set of optical components; and a cooling unit coupled to the illumination assembly, the cooling unit comprising a heat sink thermally coupled to light sources of the plurality of light units.

In various embodiments, each light source is capable of operating at a supplied electrical current between 15 amperes and 30 amperes, between 18 amperes and 28 amperes, between 20 amperes and 25 amperes, or the like. In various embodiments, each light source is electrically isolated from another light source and wherein each light source is thermally isolated from the set of optical components within each light unit.

In various embodiments, the illumination assembly is configured such that it is operable to move in a first direction with respect to the objective lens and the imaging sensor. In various embodiments, the objective lens is operable to move with respect to the illumination assembly in a second direction orthogonal to the first direction. In various embodiments, the objective lens is mounted on a linear stage and wherein the linear stage is operable to move in the second direction to in order to move the objective lens toward or away from the sample. In various embodiments, the linear stage is a voice coil stage.

In various embodiments, the illumination assembly is mounted on a movable platform that is operable to move in the first direction in order to move between a first position for illuminating the sample using a first light unit of the plurality of light units and a second position for illuminating the sample using the second light unit of the plurality of light units. In various embodiments, each set of optical components of the plurality of light units is selected such that there is less than 5% of crosstalk between received emissions from a set of fluorophores. In various embodiments, each set of optical components of the plurality of light units is selected such that there is less than about 7%, about 10%, about 12%, about 15%, about 20% or about 25% of crosstalk. In various embodiments, each set of optical components of the plurality of light units is selected such that there is between 0% and about 5%, between about 0% and about 7%, between about 0% and about 10%, between about 0% and about 15%, between about 0% and about 20%, between about 0% and about 25%, between about 3% and about 5%, between about 3% and about 7%, between about 3% and about 10%, between about 3% and about 15%, between about 3% and about 20%, or between about 3% and about 25%, of crosstalk.

In various embodiments, the system can include a tube lens assembly; and/or a mirror assembly configured for directing reflected light from the objective lens to the sensory array for capturing an image.

In accordance with various embodiments, an imaging system includes an optics plate having a first side, a second side, and a thickness therebetween, wherein the optics plate comprises a first mounting surface extending from the first side and a second mounting surface extending from the first side, wherein the first mounting surface and the second mounting surface are substantially planar, wherein the optics plate comprises an aperture between the first mounting portion and the second mounting portion; an objective lens assembly coupled to the second mounting surface; an illumination assembly disposed within the aperture; and an imaging sensor mounted on the first mounting surface, the imaging sensor configured for capturing the reflected light redirected by the kinematic fold mirror. In various embodiments, the first mounting surface and the second mounting surface are planar with one another. In various embodiments, the first mounting surface and the second mounting surface extend about 5 mm to about 6 mm orthogonally from the first side. In various embodiments, the imaging system can include a tube lens mounted on the mounting plate, the tube lens configured for guiding light reflected from the sample via the objective lens.

In accordance with various embodiments, an optical alignment plate is described. In various embodiments, the optical alignment plate includes a base having a first side, a second side, and a thickness therebetween, wherein the first side defines a first plane; a first mounting surface extending from the first side; a second mounting surface extending from the first side, wherein the first mounting surface and the second mounting surface are substantially planar and define a second plane that is parallel to the first plane, wherein the optical alignment plate comprises an aperture between the first mounting portion and the second mounting portion In various embodiments, an orthogonal distance between the first plane and the second plane can be about 1 mm to about 100 mm. In various embodiments, the orthogonal distance between the first plane and the second plane can be between about 4 mm and about 10 mm, or preferably, 5.63 mm. In various embodiments, the thickness of the optical alignment plate is between about 10 mm and about 100 mm. In various embodiments, the thickness is about 18.55 mm.

In accordance with various embodiments, a method of producing an optical alignment plate is described. In various embodiments, the method may include providing a base plate having a first side, a second side, and a thickness therebetween; forming a first mounting surface and a second mounting surface by removing material on the first side; forming an aperture in the base plate; anodizing the base plate; and forming a second plane on the first mounting surface and the second mounting surface after anodization. In various embodiments, the method can include forming one or more alignment bores in each of the first mounting surface and the second mounting surface.

In various embodiments, an optical alignment plate can be produced according to the methods as disclosed herein.

Accordingly, various embodiments of the imaging systems, apparatuses, and/or methods implemented within an analytical system for imaging of biological specimens are further described below.

The embodiments disclosed herein with respect to FIGS. 2A-2E, 3A-3F, and 4A-4G relate to optical assemblies, including optical components, e.g., an illumination assembly, or an optical assembly for illumination, for imaging and methods of implementing such assemblies within an analytical system configured for imaging of biological specimens. In accordance with various embodiments, an apparatus, such as apparatus 200 may include an illumination assembly, such as illumination assembly 240, illumination assembly 300, and/or illumination assembly 400, that includes a first light unit, such as light units 241, 341, and/or 441, having a first set of optical components comprising a first excitation filter, a first dichroic mirror, and a first emission filter altogether configured for light emission at a first band of wavelengths, and a second light unit, such as light units 242, 342, and/or 442, having a second set of optical components comprising a second excitation filter, a second dichroic mirror, and a second emission filter altogether configured for light emission at a second band of wavelengths. In various embodiments, the first and second sets of optical components of the illumination assembly are selected such that the first band of wavelengths and the second band of wavelengths have less than 5% of crosstalk. In various embodiments, the first and second sets of optical components of the illumination assembly are selected such that the first band of wavelengths and the second band of wavelengths have less than about 7%, about 10%, about 12%, about 15%, about 20% or about 25% of crosstalk. In various embodiments, the first and second sets of optical components of the illumination assembly are selected such that the first band of wavelengths and the second band of wavelengths have between 0% and about 5%, between about 0% and about 7%, between about 0% and about 10%, between about 0% and about 15%, between about 0% and about 20%, between about 0% and about 25%, between about 3% and about 5%, between about 3% and about 7%, between about 3% and about 10%, between about 3% and about 15%, between about 3% and about 20%, or between about 3% and about 25%, of crosstalk.

In various embodiments, the first light unit can also include a first light source, such as light source 351, configured to produce light for exciting a fluorophore and the first excitation filter has a first excitation band having a first minimum excitation wavelength and a first maximum excitation wavelength. In various embodiments, either of the first minimum excitation wavelength or the first maximum excitation wavelength can fall within about 10% of maximum intensity of light from the first light source. In various embodiments, the first emission filter has a first emission band having a first minimum emission wavelength and a first maximum emission wavelength. In various embodiments, either of the first minimum emission wavelength or the first maximum emission wavelength can fall within about 50% of maximum emission intensity from the fluorophore. In various embodiments, the first maximum excitation wavelength of the first excitation filter can be less than the first minimum emission wavelength of the first emission filter. In various embodiments, the first maximum excitation wavelength of the first excitation filter can be equal or substantially equal to the first minimum emission wavelength of the first emission filter.

In various embodiments, the second light unit can include a second light source, such as light source 352, configured to produce light for exciting the fluorophore, wherein the second excitation filter has a second excitation band having a second minimum excitation wavelength and a second maximum excitation wavelength. In various embodiments, either of the second minimum excitation wavelength or the second maximum excitation wavelength can fall within about 10% of maximum light intensity of light from the second light source. In various embodiments, the second emission filter has a second emission band having a second minimum emission wavelength and a second maximum emission wavelength, either of the second minimum emission wavelength or the second maximum emission wavelength can fall within about 50% of maximum emission intensity from the fluorophore.

In various embodiments, the illumination assembly can include a third light unit, such as light units 243, 343, and/or 443, having a third set of optical components comprising a third excitation filter, a third dichroic mirror, and a third emission filter altogether configured for light emission at a third band of wavelengths. In various embodiments, the first, the second, and the third sets of optical components are selected such that the first, the second, and the third bands of wavelengths have less than 5% of crosstalk. In various embodiments, the first, the second, and the third sets of optical components are selected such that the first, the second, and the third bands of wavelengths have less than about 7%, about 10%, about 12%, about 15%, about 20% or about 25% of crosstalk. In various embodiments, the first, the second, and the third sets of optical components are selected such that the first, the second, and the third bands of wavelengths have between 0% and about 5%, between about 0% and about 7%, between about 0% and about 10%, between about 0% and about 15%, between about 0% and about 20%, between about 0% and about 25%, between about 3% and about 5%, between about 3% and about 7%, between about 3% and about 10%, between about 3% and about 15%, between about 3% and about 20%, or between about 3% and about 25%, of crosstalk.

In various embodiments, the illumination assembly can include a cooling module, such as heat sink 390, coupled to the first light unit and the second light unit. In various embodiments, the cooling module can include a heat sink coupled to the first light source and the second light source. In various embodiments, the cooling module can include a cooling fluid and the heat sink includes a plurality of fins immersed in the cooling fluid.

In various embodiments, the first light source can include a first light emitting diode (LED). Similarly, the second light source can include a second LED. In various embodiments, the first LED and the second LED are each capable of operating at a supplied electrical current between 15 amperes and 30 amperes, between 18 amperes and 28 amperes, between 20 amperes and 25 amperes, or the like.

In various embodiments, the first LED and the second LED can be electrically isolated from one another. In various embodiments, the first LED and the second LED can be in thermal contact with at least a portion of the heat sink. In various embodiments, the first LED can be thermally isolated via an insulating gasket from the first set of optical components of the first light unit. Similarly, the second LED can also be thermally isolated via the insulating gasket from the second set of optical components of the second light unit, in various embodiments.

In various embodiments, the first set of optical components of the first light unit can include a first collimating lens coupled to the first LED. Similarly, the second set of optical components of the second light unit can include a second collimating lens coupled to the second LED, in various embodiments.

In various embodiments, the first light unit can include a first leaf monospring, such as monospring 436, for securing the first emission filter and the second light unit can include a second leaf monospring for securing the second emission filter. In various embodiments, the first emission filter can include a notch, such as notch 439, on a side of the first emission filter. In various embodiments, the notch is configured to ensure that the first emission filter is mounted correctly in a designated orientation.

In accordance with various embodiments, another apparatus for imaging of a sample and methods of implementing the apparatus within an analytical system configured for imaging of biological specimens are disclosed. In various embodiments, the apparatus includes an illumination assembly housing a first light unit and a second light unit, the first light unit comprising a first light source and the second light unit comprising a second light source; and a cooling module coupled to the illumination assembly, the cooling module comprising a heat sink coupled the first light source and the second light source. In various embodiments, the first light source and the second light source are each capable of operating at a supplied electrical current between 15 amperes and 30 amperes, between 18 amperes and 28 amperes, between 20 amperes and 25 amperes, or the like. In various embodiments, the first light source and the second light source are electrically isolated from one another.

In various embodiments, the cooling module, such as heat sink 390 can include a cooling fluid and the heat sink includes a plurality of fins immersed in the cooling fluid. In various embodiments, the first light source includes a first light emitting diode (LED) and the second light source includes a second LED. In various embodiments, the first LED and the second LED are in thermal contact with at least a portion of the heat sink.

In various embodiments, the first light unit includes a first set of optical components comprising a first excitation filter, a first dichroic mirror, and a first emission filter altogether configured for light emission at a first band of wavelengths. In various embodiments, the second light unit includes a second set of optical components comprising a second excitation filter, a second dichroic mirror, and a second emission filter altogether configured for light emission at a second band of wavelengths.

In various embodiments, the first LED is thermally isolated via an insulating gasket from the first set of optical components of the first light unit and the second LED is thermally isolated via the insulating gasket from the second set of optical components of the second light unit. In various embodiments, the first and second sets of optical components are selected such that the first band of wavelengths and the second band of wavelengths have less than 5% of crosstalk. In various embodiments, the first and second sets of optical components are selected such that the first band of wavelengths and the second band of wavelengths have less than about 7%, about 10%, about 12%, about 15%, about 20% or about 25% of crosstalk. In various embodiments, the first and second sets of optical components are selected such that the first band of wavelengths and the second band of wavelengths have between 0% and about 5%, between about 0% and about 7%, between about 0% and about 10%, between about 0% and about 15%, between about 0% and about 20%, between about 0% and about 25%, between about 3% and about 5%, between about 3% and about 7%, between about 3% and about 10%, between about 3% and about 15%, between about 3% and about 20%, or between about 3% and about 25%, of crosstalk.

In various embodiments, the first excitation filter has a first excitation band having a first minimum excitation wavelength and a first maximum excitation wavelength, either of which falls within about 10% of maximum intensity of light from the first light source. In various embodiments, the first emission filter has a first emission band having a first minimum emission wavelength and a first maximum emission wavelength, either of which falls within about 50% of maximum emission intensity from the fluorophore. In various embodiments, the first maximum excitation wavelength of the first excitation filter is less than the first minimum emission wavelength of the first emission filter. In various embodiments, the first maximum excitation wavelength of the first excitation filter is equal or substantially equal to the first minimum emission wavelength of the first emission filter.

In various embodiments, the second light unit can include a second light source configured to produce light for exciting the fluorophore. In various embodiments, the second excitation filter has a second excitation band having a second minimum excitation wavelength and a second maximum excitation wavelength, either of which falls within about 10% of maximum light intensity of light from the second light source. In various embodiments, the second emission filter has a second emission band having a second minimum emission wavelength and a second maximum emission wavelength, either of which falls within about 50% of maximum emission intensity from the fluorophore.

In various embodiments, the illumination assembly can include a third light unit having a third set of optical components comprising a third excitation filter, a third dichroic mirror, and a third emission filter altogether configured for light emission at a third band of wavelengths. In various embodiments, the first, the second, and the third sets of optical components are selected such that the first, the second, and the third bands of wavelengths have less than 5% of crosstalk. In various embodiments, the first, the second, and the third sets of optical components are selected such that the first, the second, and the third bands of wavelengths have less than about 7%, about 10%, about 12%, about 15%, about 20% or about 25% of crosstalk. In various embodiments, the first, the second, and the third sets of optical components are selected such that the first, the second, and the third bands of wavelengths have between 0% and about 5%, between about 0% and about 7%, between about 0% and about 10%, between about 0% and about 15%, between about 0% and about 20%, between about 0% and about 25%, between about 3% and about 5%, between about 3% and about 7%, between about 3% and about 10%, between about 3% and about 15%, between about 3% and about 20%, or between about 3% and about 25%, of crosstalk.

In various embodiments, the third light unit can include a third light source that is capable of operating at a supplied electrical current between 15 amperes and 30 amperes, between 18 amperes and 28 amperes, between 20 amperes and 25 amperes, or the like. In various embodiments, the third light source is electrically isolated from the first light source and the second light source. In various embodiments, the third light source can include a third LED that is in thermal contact with at least a portion of the heat sink and thermally isolated via the insulating gasket from the third set of optical components.

In various embodiments, the first light unit can include a first leaf monospring for securing the first emission filter and the second light unit comprises a second leaf monospring for securing the second emission filter. In various embodiments, the first emission filter can include a notch on a side of the first emission filter, wherein the notch is configured to ensure that the first emission filter is mounted correctly in a designated orientation.

In various embodiments, the availability of a wide range of cell-compatible fluorescent probes over the visible and near-IR spectrum may enable the simultaneous study of multiple cellular components, molecules and/or signals, using several fluorophores in one experiment or assay. Because optical systems used for such a study may allow only one optical channel to be examined at a time, the system may need to be extended to allow use of optical multiplexing, i.e., the acquisition of each of multiple probe signals, whether simultaneously, sequentially, or in combination.

Though the best optical performance (e.g., the highest image contrast and lowest crosstalk) may be obtained using single band filter sets and mechanized means to change excitation, dichroic, and emission filters, improvement in time resolution may be achieved at the cost of a modest reduction in performance with the judicious choice of appropriate multiband filters.

Optical Filters in Fluorescence Instrumentation: Optical filters spectrally select the light passing through the optical system so that the optical output of each fluorophore in the sample can be accurately detected at suitably low concentrations to achieve adequate sensitivity and specificity. This in turn may involve the efficient and specific excitation of each fluorophore and low-loss transmission of emitted fluorescence to the detector, while reducing detection of unwanted signals (e.g., background signals).

Figure 5:
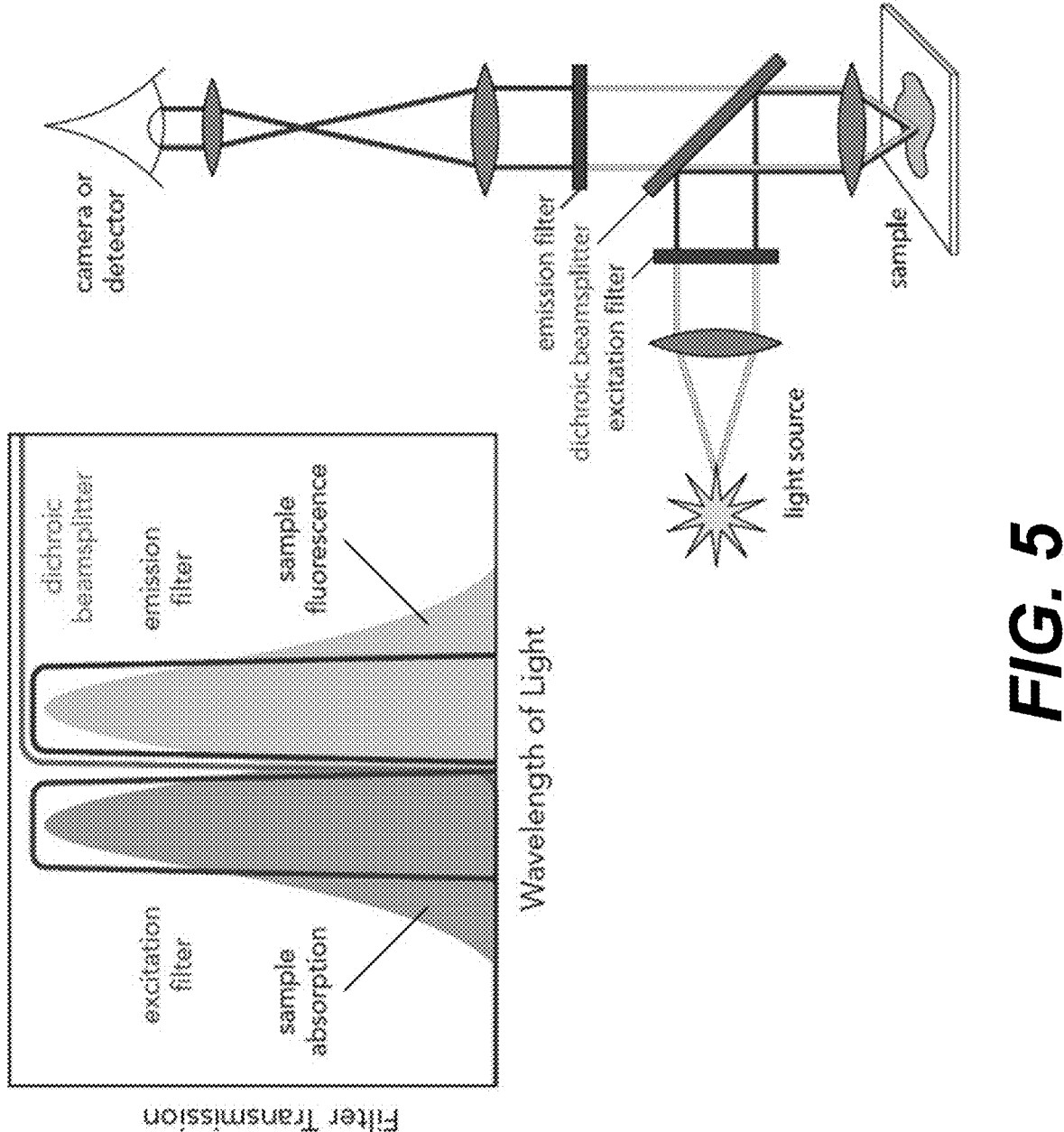
FIG. 5 illustrates a fluorescence detection instrument, in accordance with various embodiments.

FIG. 5 illustrates a fluorescence detection instrument. As shown in FIG. 5, a fluorescence detection instrument uses a combination of three filters. Each fluorophore has its own excitation and emission wavelength band. The excitation filter allows only light over a restricted range of wavelengths within the fluorophore excitation band to reach the sample, blocks light outside that range to reduce excitation of other sources of fluorescence, and blocks light over the emission band. The emission filter transmits light from the fluorophore over the chosen emission band to the detector and blocks light outside this band, especially any excitation light.

In various embodiments, the dichroic beamsplitter is an edge filter positioned at an oblique angle of incidence that efficiently directs light within the excitation and emission bands to their respective destinations.

In various embodiments, high performance filters with suitable specifications are important to maximize the signal-to-background ratio. In various embodiments, an excitation filter should have high transmission over a passband at the fluorophore's peak fluorescence excitation spectrum. In various embodiments, an emission filter should have high transmission over a suitably wide emission passband and extended out-of-band blocking to reduce the collection of scattered excitation light and background due for example to autofluorescence. In various embodiments, a dichroic should have an appropriately short transition from high reflection to high transmission levels.

In various embodiments, the sets of optical filters in a fluorescence detection system can be highly interdependent. In various embodiments, each excitation-dichroic-emission set is chosen carefully, not only for suitable results with the corresponding fluorophore, but also for suitable results with the other fluorophores.

Multi-color Detection and Crosstalk: The filters in FIG. 5 may be referred to as single band bandpass filters. In fluorescence multiplexing, in which multiple fluorophores are to be detected within a sample, two or more excitation or emission bands can be combined on a filter, resulting in multiband filters.

Figure 6:
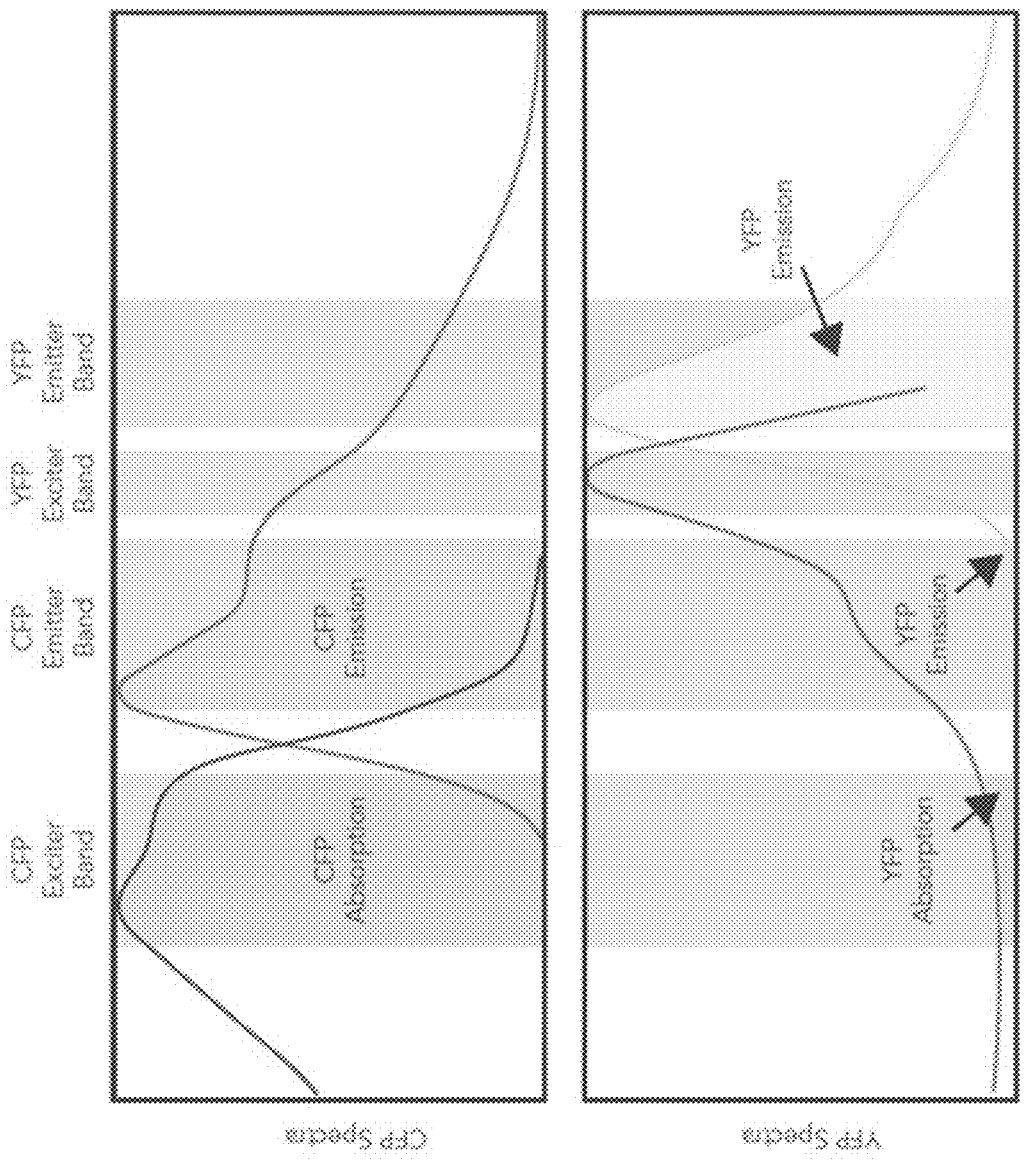
FIG. 6 illustrates spectral absorption and emission profiles of two fluorophores, in accordance with various embodiments.

In various embodiments, use of multiple fluorophores can introduce fluorescence crosstalk (also known as "bleed-through") when the spectral profiles of simultaneously excited fluorophores overlap, resulting in emission of one fluorophore into the emission passband of a different fluorophore, and in decreased detection specificity. This may be unavoidable with dense multiplexing because many fluorophores have broad spectral profiles. FIG. 6 illustrates spectral absorption and emission profiles of two fluorophores. In various embodiments, filter designs with narrower passbands are preferred options in this case. In various embodiments, the selections of passband location and width are made to minimize crosstalk without sacrificing overall throughput.

Figure 7:
FIG. 7 illustrates various excitation filter, emission filter, and dichroic configurations, in accordance with various embodiments.
Figure 7:
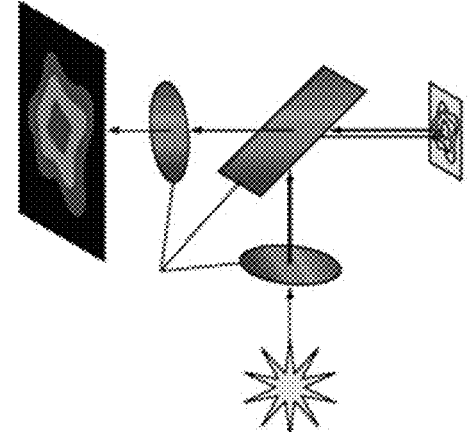
Figure 7:
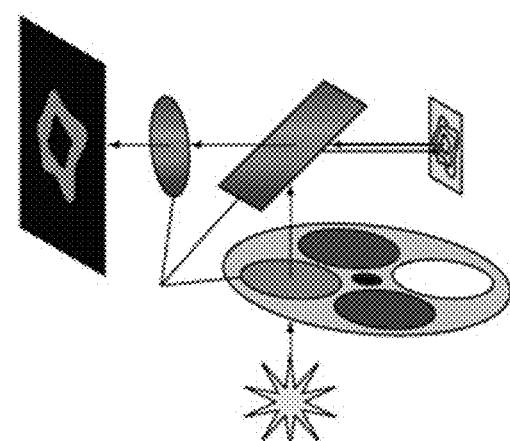
Figure 7:
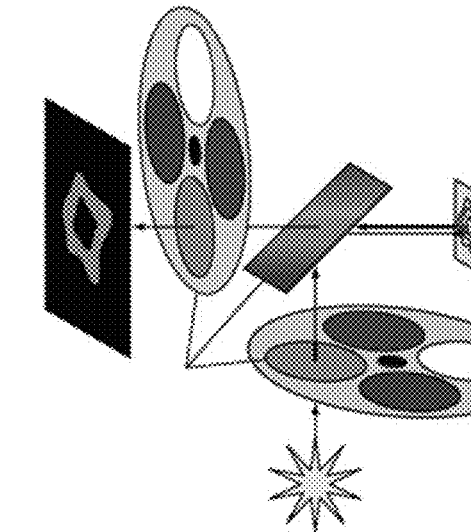

Single Band vs. Multiband: In various embodiments, single band filter sets in multiplexed situations provide flexibility with experimental design and may achieve the highest contrast and lowest fluorophore crosstalk, but can limit the rate at which complete multi-color images are captured. In various embodiments, high performance multiband optical filters allow rapid imaging without sacrificing image fidelity. In various embodiments, three types of multiband filter sets can be used for simultaneous multi-color imaging; each employs a multiband dichroic beamsplitter. FIG. 7 illustrates various excitation filter, emission filter, and dichroic configurations. In a full multiband configuration, the optics module includes a multiband exciter, a multiband emitter, and a multiband dichroic. In a Pinkel configuration, the optics module includes a multiband emitter, a multiband dichroic, and single-band exciters. In a Sedat configuration, the optics module includes a multiband dichroic, single-band exciters, and single-band emitters.

In various embodiments, a suitable tool may be used to numerically model the expected signal, background, and crosstalk for candidate fluorescence fluorophores, light sources, and detectors. In various embodiments, the model(s) can be used to select filters and optionally other components such as fluorophores and light sources.

Transmission, Blocking, Edge Steepness, and Edge Placement: In various embodiments, filters have hard sputtered dielectric coatings. In various embodiments, specifications that distinguish filters include the transmission over the passband, amount of blocking in the blocking bands, edge steepness, and edge wavelength placement accuracy.

Figure 8A:
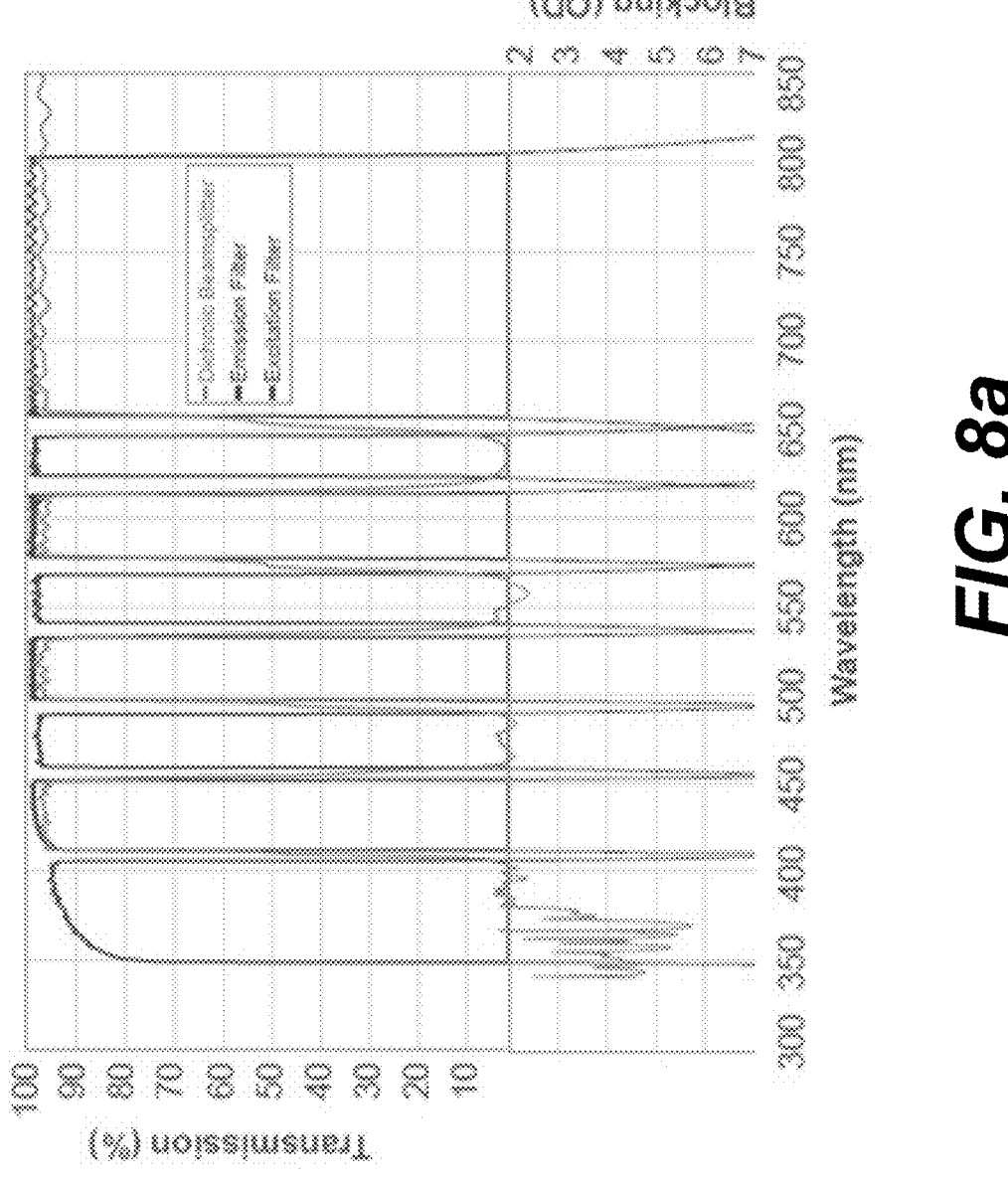
FIGS. 8A-8B illustrate performance of a set of filters, in accordance with various embodiments.
Figure 8B:
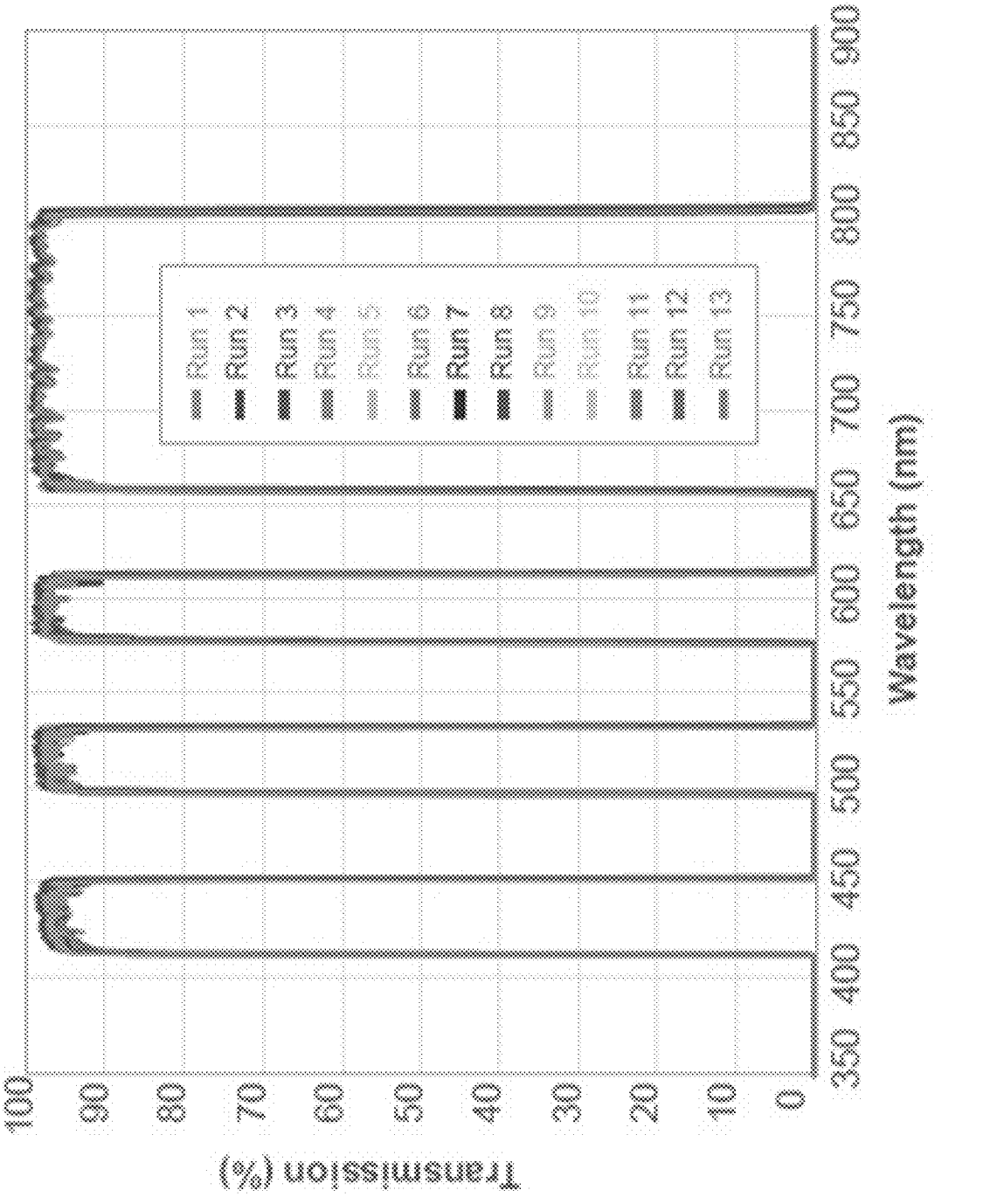

In various embodiments, the preferred characteristics of excitation, dichroic, and emission filters in terms of transmission over passband and blocking over blocking range are described in more detail below. FIGS. 8A-8B illustrates performance of a set of filters. In particular, FIGS. 8A and 8B shows the spectra of all three filters designed to optimally work together in a full quad-band set.

In various embodiments, edge steepness describes the wavelength interval needed for transition between high transmission and deep blocking (or to high reflectivity for a dichroic). In various embodiments, edge placement is the wavelength accuracy with which the spectral edge position is maintained within and between production batches. As discussed below, both these parameters can be chosen to reduce crosstalk between the exciter and the emitter for the fluorophore, and reduce crosstalk from one fluorophore into the other, all without sacrificing overall throughput.

In various embodiments, filter sets with closely positioned excitation and emission passbands are preferred for fluorophores with small Stokes shifts, to excite the fluorophore more efficiently while at the same time collecting most of the fluorescence. In various embodiments, the same may apply in optical multiplexing; fluorophore spectra overlap, so closely positioned passbands maximize signal while controlling crosstalk. In various embodiments, there can be higher risk for excitation light crosstalk into emission if significant spectral shifts of these passbands occur over different batches of filters during the production phase. In these situations, high performance filters with both steep edges and precise edge placement may be required to preserve signal and background, while reducing crosstalk. In various embodiments, rapid transition from transmission to blocking, combined with control of the wavelength range over which this transition takes place, allows for deep blocking between bands, even when they are closely spaced. In various embodiments, having edges that are repeatably positioned as close as possible to the nominal optimum location results in higher system brightness with low and controlled crosstalk. In various embodiments, precise edge placement with high batch to batch consistency allows for reliable quantitative analysis, so that each instrument delivers the same results.

In various embodiments, wavefront quality may be important in imaging applications, as wavefront distortion can degrade image quality by reducing contrast or compromising resolution. In various embodiments, optical filters may be selected with low transmitted wavefront error (TWE) over the imaging path, and/or with low reflected wavefront error (RWE) for reflected light.

In various embodiments, the spectral edge of a filter shifts towards the blue with increasing Angle of Incidence (AOI), so the behavior of a filter may be assessed if used with a beam having a range of AOI values; this can be an especially useful in compact optical systems where beams may have a larger range of AOI values. In various embodiments, consideration of this effect can reduce undesired spectral performance, especially in dichroics, which affect signal and noise. In various embodiments, filter surface cosmetic quality may be considered, especially in systems that have filters close to conjugate focal planes.

In accordance with various embodiments, an imaging system can include any or all of the features described above with respect to the apparatus, such as apparatus 200, disclosed herein.

In accordance with various embodiments, a method of forming an image using any or all of the features described above with respect to the apparatus disclosed herein.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

V. Recitation of Embodiments

Embodiment 1: An imaging system, comprising: an optical mounting plate having a first portion, a second portion, and an aperture disposed between the first portion and the second portion; an imaging sensor disposed on the first portion; an objective lens disposed on the second portion; and an illumination assembly arranged within the aperture and disposed between the imaging sensor and the objective lens.

Embodiment 2: The imaging system of embodiment 1, wherein the illumination assembly is operable to move in a first direction with respect to the objective lens and the imaging sensor, and wherein the objective lens is operable to move with respect to the illumination assembly in a second direction, wherein the second direction is orthogonal to the first direction.

Embodiment 3: The imaging system of embodiments 1 or 2, wherein the illumination assembly comprises a first light unit comprising a first emission filter and a second light unit comprising a second emission filter, wherein wavelengths of the first and the second emission filters are selected such that there is less than about 5% crosstalk between received emissions from a set of fluorophores.

Embodiment 4: The imaging system of embodiments 1 or 2, wherein the illumination assembly comprises a first light unit comprising a first emission filter, a second light unit comprising a second emission filter, and a third light unit comprising a third emission filter, wherein wavelengths of the first, the second, and the third emission filters are selected such that there is less than about 5% crosstalk between received emissions from a set of fluorophores.

Embodiment 5: The imaging system of embodiments 1 or 2, wherein the illumination assembly comprises a first emission filter, a second emission filter, a third emission filter, and a fourth emission filter, wherein wavelengths of the first, the second, the third, and the third emission filters are selected such that there is less than about 5% crosstalk between received emissions from a set of fluorophores.

Embodiment 6: The imaging system of embodiments 1 or 2, wherein the illumination assembly comprises a first light unit and a second light unit, the first light unit comprising a first excitation filter, a first dichroic mirror, and a first emission filter and the second light unit comprising a second excitation filter, a second dichroic mirror, and a second emission filter, wherein the first and the second excitation filters, the first and the second dichroic mirrors, and the first and the second emission filters are selected such that there is less than about 5% crosstalk between received emissions from a set of fluorophores.

Embodiment 7: The imaging system of any one of embodiments 1-6, wherein the objective lens is mounted on a linear stage coupled to the second portion of the optical mounting plate and wherein the linear stage is operable to move in the second direction to in order to move the objective lens toward or away from a sample.

Embodiment 8: The imaging system of embodiment 7, wherein the illumination assembly is mounted on a movable platform that is operable to move in the first direction in order to move between a first position for illuminating the sample using the first light unit and a second position for illuminating the sample using the second light unit.

Embodiment 9: The imaging system of any one of embodiments 1-8, wherein the linear stage comprises a voice coil actuator.

Embodiment 10: The imaging system of any one of embodiments 1-9, further comprising: a tube lens configured for guiding light reflected from the sample via the objective lens; and a kinematic fold mirror configured for redirecting the reflected light from the objective lens to the imaging sensor for capturing an image.

Embodiment 11: The imaging system of any one of embodiments 3-10, wherein the first light unit further comprises an excitation filter, wherein the excitation filter has an excitation band from a minimum excitation wavelength and a maximum excitation wavelength, wherein the minimum excitation wavelength and the maximum excitation wavelength are within a range of about ±10% of a maximum intensity wavelength of light from the light source.

Embodiment 12: The imaging system of any one of embodiments 3-11, wherein the first light unit further comprises an emission filter, wherein the emission filter has an emission band from a minimum emission wavelength to a maximum emission wavelength, wherein the minimum emission wavelength and the maximum emission wavelength are within a range of about ±50% of a maximum emission intensity wavelength from at least one of the set of fluorophores.

Embodiment 13: The imaging system of embodiments 11 or 12, wherein the maximum excitation wavelength of the excitation filter is less than the minimum emission wavelength of the emission filter.

Embodiment 14: The imaging system of any one of embodiments 11-13, wherein the maximum excitation wavelength of the excitation filter is equal or substantially equal to the minimum emission wavelength of the emission filter.

Embodiment 15: The imaging system of any one of embodiments 3-14, further comprising: a cooling module coupled to the first light unit and the second light unit of the illumination assembly, wherein the cooling module comprises a heat sink configured to transfer heat away from the first light source and the second light source via a working fluid that flows through the heat sink.

Embodiment 16: The imaging system of any one of embodiments 3-15, wherein the first light source comprises a first light emitting diode (LED) and the second light source comprises a second LED.

Embodiment 17: The imaging system of embodiment 16, wherein the first LED and the second LED are electrically isolated from one another.

Embodiment 18: The imaging system of embodiments 16 or 17, wherein the first LED and the second LED are each capable of operating at a supplied electrical current between 15 amperes and 30 amperes.

Embodiment 19: The imaging system of any one of embodiments 16-18, wherein the first LED is thermally isolated from the first emission filter, the first dichroic mirror, and the first emission filter of the first light unit via an insulating gasket.

Embodiment 20: The imaging system of embodiment 19, wherein the second LED is thermally isolated from the second emission filter, the second dichroic mirror, and the second emission filter of the second light unit via the insulating gasket.

Embodiment 21: A system, comprising: a sensor array configured for imaging a sample; an objective lens assembly optically coupled to the sensory array; an illumination assembly disposed between the sensor array and the objective lens assembly, the illumination assembly comprising a plurality of light units with each light unit comprising a light source and a set of optical components; and a cooling module coupled to the illumination assembly, the cooling module comprising a heat sink thermally coupled to light sources of the plurality of light units.

Embodiment 22: The system of embodiment 21, wherein each light source is capable of operating at a supplied electrical current between 15 amperes and 30 amperes.

Embodiment 23: The system of embodiments 21 or 22, wherein each light source is electrically isolated from another light source and wherein each light source is thermally isolated from the set of optical components within each light unit.

Embodiment 24: The system of any one of embodiments 21-23, wherein the illumination assembly is operable to move in a first direction with respect to the objective lens and the imaging sensor.

Embodiment 25: The system of any one of embodiments 21-24, wherein the objective lens is operable to move with respect to the illumination assembly in a second direction orthogonal to the first direction.

Embodiment 26: The system of embodiment 25, wherein the objective lens is mounted on a linear stage and wherein the linear stage is operable to move in the second direction to in order to move the objective lens toward or away from the sample.

Embodiment 27: The system of embodiment 26, wherein the linear stage is a voice coil stage.

Embodiment 28: The system of any one of embodiments 24-27, wherein the illumination assembly is mounted on a movable platform that is operable to move in the first direction in order to move between a first position for illuminating the sample using a first light unit of the plurality of light units and a second position for illuminating the sample using the second light unit of the plurality of light units.

Embodiment 29: The system of embodiment 28, wherein each set of optical components of the plurality of light units is selected such that there is less than 5% of crosstalk between received emissions from a set of fluorophores.

Embodiment 30: The system of any one of embodiments 22-29, further comprising: a tube lens assembly; and a mirror assembly configured for directing reflected light from the objective lens to the sensory array for capturing an image.

Embodiment 31: An imaging system, comprising: an optics plate having a first side, a second side, and a thickness therebetween, wherein the optics plate comprises a first mounting surface extending from the first side and a second mounting surface extending from the first side, wherein the first mounting surface and the second mounting surface are substantially planar, wherein the optics plate comprises an aperture between the first mounting portion and the second mounting portion; an objective lens assembly coupled to the second mounting surface; an illumination assembly disposed within the aperture; and an imaging sensor mounted on the first mounting surface, the imaging sensor configured for capturing the reflected light redirected by the kinematic fold mirror.

Embodiment 32: The imaging system of embodiment 31, wherein the first mounting surface and the second mounting surface are planar with one another.

Embodiment 33: The imaging system of embodiment 31 or 32, wherein the first mounting surface and the second mounting surface extend about 5 mm to about 6 mm orthogonally from the first side.

Embodiment 34: The imaging system of any one of embodiments 31-33, further comprising a tube lens mounted on the mounting plate, the tube lens configured for guiding light reflected from the sample via the objective lens.

Embodiment 35: An optical alignment plate comprising: a base having a first side, a second side, and a thickness therebetween, wherein the first side defines a first plane; a first mounting surface extending from the first side; a second mounting surface extending from the first side, wherein the first mounting surface and the second mounting surface are substantially planar and define a second plane that is parallel to the first plane, wherein the optical alignment plate comprises an aperture between the first mounting portion and the second mounting portion.

Embodiment 36: The optical alignment plate of embodiment 35, wherein an orthogonal distance between the first plane and the second plane is about 1 mm to about 100 mm.

Embodiment 37: The optical alignment plate of embodiment 36, wherein the orthogonal distance between the first plane and the second plane is between about 4 mm and about 10 mm, or preferably, 5.63 mm.

Embodiment 38: The optical alignment plate of any one of embodiments 35 to 37, wherein the thickness is between about 10 mm and about 100 mm.

Embodiment 39: The optical alignment plate of embodiment 38, wherein the thickness is about 18.55 mm.

Embodiment 40: A method of producing an optical alignment plate, comprising: providing a base plate having a first side, a second side, and a thickness therebetween; forming a first mounting surface and a second mounting surface by removing material on the first side; forming an aperture in the base plate; anodizing the base plate; and forming a second plane on the first mounting surface and the second mounting surface after anodization.

Embodiment 41: The method of embodiment 41, further comprising: forming one or more alignment bores in each of the first mounting surface and the second mounting surface.

Embodiment 42: An optical alignment plate produced according to the method of any one of embodiments 40 or 41.

Embodiment 40: A method of producing an optical alignment plate, comprising: providing a base plate having a first side, a second side, and a thickness therebetween; forming a first mounting surface and a second mounting surface by removing material on the first side; forming an aperture in the base plate; anodizing the base plate; and forming a second plane on the first mounting surface and the second mounting surface after anodization.

Embodiment 41: The method of embodiment 41, further comprising: forming one or more alignment bores in each of the first mounting surface and the second mounting surface.

Embodiment 42: An optical alignment plate produced according to the method of any one of embodiments 40 or 41.

Embodiment 43: An apparatus, comprising: a first light unit having a first set of optical components comprising a first excitation filter, a first dichroic mirror, and a first emission filter altogether configured for light emission at a first band of wavelengths, and a second light unit having a second set of optical components comprising a second excitation filter, a second dichroic mirror, and a second emission filter altogether configured for light emission at a second band of wavelengths, wherein the first and second sets of optical components are selected such that the first band of wavelengths and the second band of wavelengths have less than 5% of crosstalk.

Embodiment 44: The apparatus of embodiment 43, wherein the first light unit further comprises a first light source configured to produce light for exciting a first fluorophore and the first excitation filter has a first excitation band having a first minimum excitation wavelength and a first maximum excitation wavelength, wherein the first minimum excitation wavelength and the first maximum excitation wavelength are within a range of about ±10% of a maximum intensity wavelength of light from the first light source.

Embodiment 45: The apparatus of embodiment 44, wherein the first emission filter has a first emission band having a first minimum emission wavelength and a first maximum emission wavelength, wherein the first minimum emission wavelength and the first maximum emission wavelength are within a range of about ±50% of a maximum emission intensity wavelength from the first fluorophores.

Embodiment 46: The apparatus of embodiment 45, wherein the first maximum excitation wavelength of the first excitation filter is less than the first minimum emission wavelength of the first emission filter.

Embodiment 47: The apparatus of embodiment 45, wherein the first maximum excitation wavelength of the first excitation filter is equal or substantially equal to the first minimum emission wavelength of the first emission filter.

Embodiment 48: The apparatus of any one of embodiments 43 to 47, wherein the second light unit further comprises a second light source configured to produce light for exciting a second fluorophore, wherein the second excitation filter has a second excitation band having a second minimum excitation wavelength and a second maximum excitation wavelength, wherein the second minimum excitation wavelength and the second maximum excitation wavelength are within a range of about ±10% of a maximum intensity wavelength of light from the second light source.

Embodiment 49: The apparatus of embodiment 48, wherein the second emission filter has a second emission band having a second minimum emission wavelength and a second maximum emission wavelength, wherein the second minimum emission wavelength and the second maximum emission wavelength are within a range of about ±50% of a maximum emission intensity wavelength from the second fluorophore.

Embodiment 50. The apparatus of any one of embodiments 43 to 49, wherein the illumination assembly further comprises a third light unit having a third set of optical components comprising a third excitation filter, a third dichroic mirror, and a third emission filter altogether configured for light emission at a third band of wavelengths, wherein the first, the second, and the third sets of optical components are selected such that the first, the second, and the third bands of wavelengths have less than 5% of crosstalk.

Embodiment 51: The apparatus of any one of embodiments 43 to 50, wherein the illumination assembly comprises a cooling module coupled to the first light unit and the second light unit, wherein the cooling module comprises a heat sink coupled to the first light source and the second light source.

Embodiment 52: The apparatus of embodiment 51, wherein the cooling module comprises a cooling fluid and the heat sink comprises a plurality of fins immersed in the cooling fluid.

Embodiment 53: The apparatus of embodiments 51 or 52, wherein the first light source comprises a first light emitting diode (LED) and the second light source comprises a second LED.

Embodiment 54: The apparatus of embodiment 53, wherein the first LED and the second LED are each capable of operating at a supplied electrical current between 15 amperes and 30 amperes.

Embodiment 55: The apparatus of embodiments 53 or 54, wherein the first LED and the second LED are electrically isolated from one another.

Embodiment 56: The apparatus of any one of embodiments 53 to 55, wherein the first LED and the second LED are in thermal contact with at least a portion of the heat sink.

Embodiment 57: The apparatus of any one of embodiments 53 to 56, wherein the first LED is thermally isolated via an insulating gasket from the first set of optical components of the first light unit and the second LED is thermally isolated via the insulating gasket from the second set of optical components of the second light unit.

Embodiment 58: The apparatus of any one of embodiments 53 to 57, wherein the first set of optical components of the first light unit comprises a first collimating lens coupled to the first LED and the second set of optical components of the second light unit comprises a second collimating lens coupled to the second LED.

Embodiment 59: The apparatus of any one of embodiments 43 to 58, wherein the first light unit comprises a first leaf monospring for securing the first emission filter and the second light unit comprises a second leaf monospring for securing the second emission filter.

Embodiment 60: The apparatus of any one of embodiments 43 to 59, wherein the first emission filter comprises a notch on a side of the first emission filter, wherein the notch is configured to ensure that the first emission filter is mounted correctly in a designated orientation.

Embodiment 61: An apparatus comprising: a first light unit and a second light unit, the first light unit comprising a first light source and the second light unit comprising a second light source; and a cooling module comprising a heat sink coupled the first light source and the second light source, wherein the first light source and the second light source are each capable of operating at a supplied electrical current between 15 amperes and 30 amperes and are electrically isolated from one another.

Embodiment 62: The apparatus of embodiment 61, wherein the cooling module comprises a cooling fluid and the heat sink comprises a plurality of fins immersed in the cooling fluid.

Embodiment 63: The apparatus of embodiments 61 or 62, wherein the first light source comprises a first light emitting diode (LED) and the second light source comprises a second LED.

Embodiment 64: The apparatus of embodiment 63, wherein the first LED and the second LED are each capable of operating at a supplied electrical current between 20 amperes and 25 amperes.

Embodiment 65: The apparatus of embodiments 63 or 64, wherein the first LED and the second LED are in thermal contact with at least a portion of the heat sink.

Embodiment 66: The apparatus of any one of embodiments 61 to 65, wherein: the first light unit further comprises a first set of optical components comprising a first excitation filter, a first dichroic mirror, and a first emission filter altogether configured for light emission at a first band of wavelengths; and the second light unit having a second set of optical components comprising a second excitation filter, a second dichroic mirror, and a second emission filter altogether configured for light emission at a second band of wavelengths.

Embodiment 67: The apparatus of embodiment 66, wherein the first LED is thermally isolated via an insulating gasket from the first set of optical components of the first light unit and the second LED is thermally isolated via the insulating gasket from the second set of optical components of the second light unit.

Embodiment 68: The apparatus of embodiments 66 or 67, wherein the first and second sets of optical components are selected such that the first band of wavelengths and the second band of wavelengths have less than 5% of crosstalk.

Embodiment 69: The apparatus of any one of embodiments 66 to 68, wherein the first excitation filter has a first excitation band from a first minimum excitation wavelength to a first maximum excitation wavelength, wherein the first minimum excitation wavelength and the first maximum excitation wavelength are within a range of about ±10% of a maximum intensity wavelength of light from the first light source.

Embodiment 70: The apparatus of any one of embodiments 66 to 69, wherein the first emission filter has a first emission band from a first minimum emission wavelength to a first maximum emission wavelength, wherein the first minimum emission wavelength and the first maximum emission wavelength are within a range of about ±50% of a maximum emission intensity wavelength from the first fluorophore.

Embodiment 71: The apparatus of embodiment 70, wherein the first maximum excitation wavelength of the first excitation filter is less than the first minimum emission wavelength of the first emission filter.

Embodiment 72: The apparatus of embodiment 70, wherein the first maximum excitation wavelength of the first excitation filter is equal or substantially equal to the first minimum emission wavelength of the first emission filter.

Embodiment 73: The apparatus of any one of embodiments 61 to 72, wherein the second light unit further comprises a second light source configured to produce light for exciting a second fluorophore, wherein the second excitation filter has a second excitation band from a second minimum excitation wavelength to a second maximum excitation wavelength, wherein the second minimum excitation wavelength and the second maximum excitation wavelength are within a range of about ±10% of a maximum intensity wavelength of light from the second light source.

Embodiment 74: The apparatus of embodiment 73, wherein the second emission filter has a second emission band from a second minimum emission wavelength to a second maximum emission wavelength, wherein the second minimum emission wavelength and the second maximum emission wavelength are within a range of about ±50% of a maximum emission intensity wavelength from the second fluorophore.

Embodiment 75: The apparatus of any one of embodiments 61 to 74, wherein the illumination assembly further comprises a third light unit having a third set of optical components comprising a third excitation filter, a third dichroic mirror, and a third emission filter altogether configured for light emission at a third band of wavelengths, wherein the first, the second, and the third sets of optical components are selected such that the first, the second, and the third bands of wavelengths have less than 5% of crosstalk.

Embodiment 76: The apparatus of embodiment 75, wherein the third light unit further comprises a third light source that is capable of operating at a supplied electrical current between 15 amperes and 30 amperes and is electrically isolated from the first light source and the second light source.

Embodiment 77: The apparatus of embodiments 75 or 76, wherein the third light source comprises a third LED that is in thermal contact with at least a portion of the heat sink and thermally isolated via the insulating gasket from the third set of optical components.

Embodiment 78: The apparatus of any one of embodiments 61 to 77, wherein the first light unit comprises a first leaf monospring for securing the first emission filter and the second light unit comprises a second leaf monospring for securing the second emission filter.

Embodiment 79: The apparatus of any one of embodiments 61 to 78, wherein the first emission filter comprises a notch on a side of the first emission filter, wherein the notch is configured to ensure that the first emission filter is mounted correctly in a designated orientation.

Embodiment 80: An imaging system comprising the apparatus of any one of embodiments 43-60.

Embodiment 81: A method of forming an image using the apparatus of any one of embodiments 43-60.

Embodiment 82: An imaging system comprising the apparatus of any one of embodiments 61-79.

Embodiment 83: A method of imaging using the apparatus of any one of embodiments 61-79.

What is claimed:

1. An apparatus, comprising:
a first light unit having a first set of optical components comprising a first excitation filter, a first dichroic mirror, and a first emission filter altogether configured for light emission at a first band of wavelengths;
a second light unit having a second set of optical components comprising a second excitation filter, a second dichroic mirror, and a second emission filter altogether configured for light emission at a second band of wavelengths; and
a third light unit having a third set of optical components comprising a third excitation filter, a third dichroic mirror, and a third emission filter altogether configured for light emission at a third band of wavelengths;
wherein:
the first, the second, and the third sets of optical components are arranged substantially parallel with each other; and
the first, the second, and the third sets of optical components are selected such that the first, the second, and the third bands of wavelengths have less than 10% of crosstalk.

2. The apparatus of claim 1, wherein the first light unit further comprises a first light source configured to produce light for exciting a first fluorophore and the first excitation filter has a first excitation band having a first minimum excitation wavelength and a first maximum excitation wavelength, wherein the first minimum excitation wavelength and the first maximum excitation wavelength are within a range of about ±10% of a maximum intensity wavelength of light from the first light source.

3. The apparatus of claim 2, wherein the first emission filter has a first emission band having a first minimum emission wavelength and a first maximum emission wavelength, wherein the first minimum emission wavelength and the first maximum emission wavelength are within a range of about ±50% of a maximum emission intensity wavelength from the first fluorophores.

4. The apparatus of claim 3, wherein the first maximum excitation wavelength of the first excitation filter is less than the first minimum emission wavelength of the first emission filter.

5. The apparatus of claim 3, wherein the first maximum excitation wavelength of the first excitation filter is equal or substantially equal to the first minimum emission wavelength of the first emission filter.

6. The apparatus of claims 1, wherein the second light unit further comprises a second light source configured to produce light for exciting a second fluorophore, wherein the second excitation filter has a second excitation band having a second minimum excitation wavelength and a second maximum excitation wavelength, wherein the second minimum excitation wavelength and the second maximum excitation wavelength are within a range of about ±10% of a maximum intensity wavelength of light from the second light source.

7. The apparatus of claim 6, wherein the second emission filter has a second emission band having a second minimum emission wavelength and a second maximum emission wavelength, wherein the second minimum emission wavelength and the second maximum emission wavelength are within a range of about ±50% of a maximum emission intensity wavelength from the second fluorophore.

8. The apparatus of claim 1, wherein the illumination assembly comprises a cooling module coupled to the first light unit and the second light unit, wherein the cooling module comprises a heat sink coupled to a first light source and a second light source.

9. The apparatus of claim 8, wherein the cooling module comprises a cooling fluid and the heat sink comprises a plurality of fins immersed in the cooling fluid.

10. The apparatus of claim 8, wherein the first light source comprises a first light emitting diode (LED) and the second light source comprises a second LED.

11. The apparatus of claim 10, wherein the first LED and the second LED are each capable of operating at a supplied electrical current between 15 amperes and 30 amperes.

12. The apparatus of claim 10, wherein the first LED and the second LED are in thermal contact with at least a portion of the heat sink.

13. The apparatus of claim 10, wherein the first LED is thermally isolated via an insulating gasket from the first set of optical components of the first light unit and the second LED is thermally isolated via the insulating gasket from the second set of optical components of the second light unit.

14. The apparatus of claim 10, wherein the first set of optical components of the first light unit comprises a first collimating lens coupled to the first LED and the second set of optical components of the second light unit comprises a second collimating lens coupled to the second LED.

15. The apparatus of claim 1, wherein the first light unit comprises a first leaf monospring for securing the first emission filter and the second light unit comprises a second leaf monospring for securing the second emission filter.

16. The apparatus of claim 1, wherein the first emission filter comprises a notch on a side of the first emission filter, wherein the notch is configured to ensure that the first emission filter is mounted correctly in a designated orientation.

17. The apparatus of claim 1, wherein the first set of optical components are aligned along a first optical axis, the second set of optical components are aligned along a second optical axis, and the third set of optical components are aligned along a third optical axis; and wherein the first, the second, and the third sets of optical components are arranged substantially parallel with respect to one another such that the first, the second, and the third optical axes are substantially parallel.

18. A system comprising:

a housing having the apparatus of claim 1 therein; and a movable platform on which the housing is secured, the movable platform operable to move in a first direction between a first position for illuminating a sample using the first light unit and a second position for illuminating the sample using the second light unit.

19. An apparatus, comprising:

a first light unit having a first light source and a first set of optical components comprising a first excitation filter, a first adjustable aperture between the first light source and the first excitation filter, a first dichroic mirror, and a first emission filter altogether configured for light emission at a first band of wavelengths, wherein the components of the first set of optical components are aligned along a first optical axis, and the first adjustable aperture is adjustable along the first optical axis to regulate light travelling along the first optical axis and block off-axis rays passing through a center of the first adjustable aperture; and a second light unit having a second light source and a second set of optical components comprising a second excitation filter, a second adjustable aperture between the second light source and the second excitation filter, a second dichroic mirror, and a second emission filter altogether configured for light emission at a second band of wavelengths, wherein the components of the second set of optical components are aligned along a second optical axis, and the second adjustable aperture is adjustable along the second optical axis to regulate light travelling along the second optical axis and block off-axis rays passing through a center of the second adjustable aperture;

wherein the first and the second sets of optical components are selected such that the first band of wavelengths and the second band of wavelengths have less than 10% of crosstalk.

20. The apparatus of claim 19, further comprising a third light unit having a third light source and a third set of optical components comprising a third excitation filter, a third adjustable aperture between the third light source and the third excitation filter, a third dichroic mirror, and a third emission filter altogether configured for light emission at a third band of wavelengths;

wherein the first, the second, and the third sets of optical components are arranged substantially parallel with each other, and wherein the first, the second, and the third sets of optical components are selected such that the first band of wavelengths, the second band of wavelengths, and the third band of wavelengths have less than 10% of crosstalk.

* * * * *